US011865851B2

(12) United States Patent
Iizuka

(10) Patent No.: US 11,865,851 B2
(45) Date of Patent: Jan. 9, 2024

(54) IMAGE FORMING APPARATUS

(71) Applicant: FUJIFILM Business Innovation Corp., Tokyo (JP)

(72) Inventor: Takahiro Iizuka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 33 days.

(21) Appl. No.: 17/560,293

(22) Filed: Dec. 23, 2021

(65) Prior Publication Data

US 2023/0055676 A1 Feb. 23, 2023

(30) Foreign Application Priority Data

Aug. 23, 2021 (JP) ................................ 2021-135288

(51) Int. Cl.
*B41J 29/02* (2006.01)
*B41J 29/13* (2006.01)

(52) U.S. Cl.
CPC ............... *B41J 29/02* (2013.01); *B41J 29/13* (2013.01)

(58) Field of Classification Search
CPC ................................ B41J 29/02; B41J 29/13
See application file for complete search history.

(56) References Cited

FOREIGN PATENT DOCUMENTS

| | | |
|---|---|---|
| JP | 2005084439 | 3/2005 |
| JP | 2012098531 | 5/2012 |

(Continued)

OTHER PUBLICATIONS

Yoneyama, Takeshi; Image Forming Apparatus; Jun. 28, 2012 Japan, All (Year: 2012).*

(Continued)

*Primary Examiner* — Justin Seo
*Assistant Examiner* — Tracey M McMillion
(74) *Attorney, Agent, or Firm* — JCIPRNET

(57) ABSTRACT

An image forming apparatus includes: a housing; an image forming part that forms an image on a recording medium; a medium discharge part that has a space opened to an outside through a front face opening off-centered toward one of left and right on a front face of the housing and a side face opening continuous from the front face opening and in which a recording medium on which an image has been formed by the image forming part is discharged to the space; a first opening and closing covering that is opened and closed to cover a part including a part of the front face opening of the medium discharge part on the front face of the housing; and a second covering that covers at least a part excluding the part covered with the first opening and closing covering on the front face of the housing, is almost perpendicular to an installation surface, and is longer in an up-down direction than the first opening and closing covering. The first opening and closing covering is attached so that a lower end part thereof in a closed state is connected to an upper part of the second covering by an opening closing support member that supports the first opening and closing covering so as to open the first opening and closing covering toward a near side with respect to the front face of the housing by rotating about at least one moving shaft, and thereby the first opening and closing covering is openable to such an extent that a distance between a lower end part thereof in an opened state and the second covering becomes 10 mm or less.

15 Claims, 14 Drawing Sheets

(56) References Cited

FOREIGN PATENT DOCUMENTS

| | | | | |
|---|---|---|---|---|
| JP | 2012113220 | A | * | 6/2012 |
| JP | 2012118133 | A | * | 6/2012 |
| JP | 2012123234 | A | * | 6/2012 |
| JP | 5594065 | B2 | * | 9/2014 |
| JP | 2016016945 | | | 2/2016 |

OTHER PUBLICATIONS

Chen, Du; A Hinge Mechanism and Sofa; Aug. 20, 2021; China, All (Year: 2021).*

* cited by examiner

IMAGE FORMING APPARATUS

CROSS-REFERENCE TO RELATED APPLICATIONS

This application is based on and claims priority under 35 USC 119 from Japanese Patent Application No. 2021-135288 filed Aug. 23, 2021.

BACKGROUND

(i) Technical Field

The present disclosure relates to an image forming apparatus.

(ii) Related Art

Japanese Unexamined Patent Application Publication No. 2016-16945 (paragraph 0031, FIG. 3, FIG. 2) describes an image forming apparatus including an in-body paper discharge part to which a sheet is discharged from an apparatus body and a paper discharge front covering and a paper discharge left covering that are openable and closable and cover an opening of the in-body paper discharge part to keep an inside of the in-body paper discharge part almost air-tight, wherein the paper discharge front covering and the paper discharge left covering are provided on the apparatus body rotatably about rotary shafts provided on lower end sides of the coverings.

Japanese Unexamined Patent Application Publication No. 2012-98531 (paragraphs 0009, 0015 to 0017, and 0030, FIG. 1, FIG. 3) describes a recording material processing apparatus including an in-body stacking part to which a sheet is discharged from an apparatus body and a covering member that covers a front face of a space of the in-body stacking part, wherein the covering member is provided on the apparatus body rotatably about a hinge (shaft) disposed on a lower end side of the covering.

SUMMARY

Aspects of non-limiting embodiments of the present disclosure relate to an image forming apparatus in which a recording medium discharged to a medium discharge part is easier to take out than in the following case.

The following case is a case where in an image forming apparatus having a medium discharge part having a space that is opened on a front side off-centered toward one of left and right on a front face of a housing and opened on the one of the left and right and to which a recording medium on which an image has been formed is discharged, an opening and closing covering that is opened and closed to cover the front side of the medium discharge part is openable only to an angle of approximately 90° to 150° toward a near side with respect to the front face of the housing when a position directly above a direction of gravitational force is 0° in a case where the opening and closing covering opens about a lower hinge provided on a lower end side thereof. Alternatively, the following case is a case where in the image forming apparatus, the opening and closing covering is openable only to an angle of approximately 90° to 150° toward the near side with respect to the front face of the housing when a position directly below a direction of gravitational force is 0° in a case where the opening and closing covering opens about an upper hinge provided on an upper end side thereof.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including: a housing; an image forming part that forms an image on a recording medium; a medium discharge part that has a space opened to an outside through a front face opening off-centered toward one of left and right on a front face of the housing and a side face opening continuous from the front face opening and in which a recording medium on which an image has been formed by the image forming part is discharged to the space; a first opening and closing covering that is opened and closed to cover a part including a part of the front face opening of the medium discharge part on the front face of the housing; and a second covering that covers at least a part excluding the part covered with the first opening and closing covering on the front face of the housing, is almost perpendicular to an installation surface, and is longer in an up-down direction than the first opening and closing covering, wherein the first opening and closing covering is attached so that a lower end part thereof in a closed state is connected to an upper part of the second covering by an opening closing support member that supports the first opening and closing covering so as to open the first opening and closing covering toward a near side with respect to the front face of the housing by rotating about at least one moving shaft, and thereby the first opening and closing covering is openable to such an extent that a distance between a lower end part thereof in an opened state and the second covering becomes 10 mm or less.

BRIEF DESCRIPTION OF THE DRAWINGS

Exemplary embodiments of the present disclosure will be described in detail based on the following figures, wherein.

DETAILED DESCRIPTION

Exemplary embodiments of the present disclosure are described below with reference to the drawings.

First Exemplary Embodiment

Figure 1:
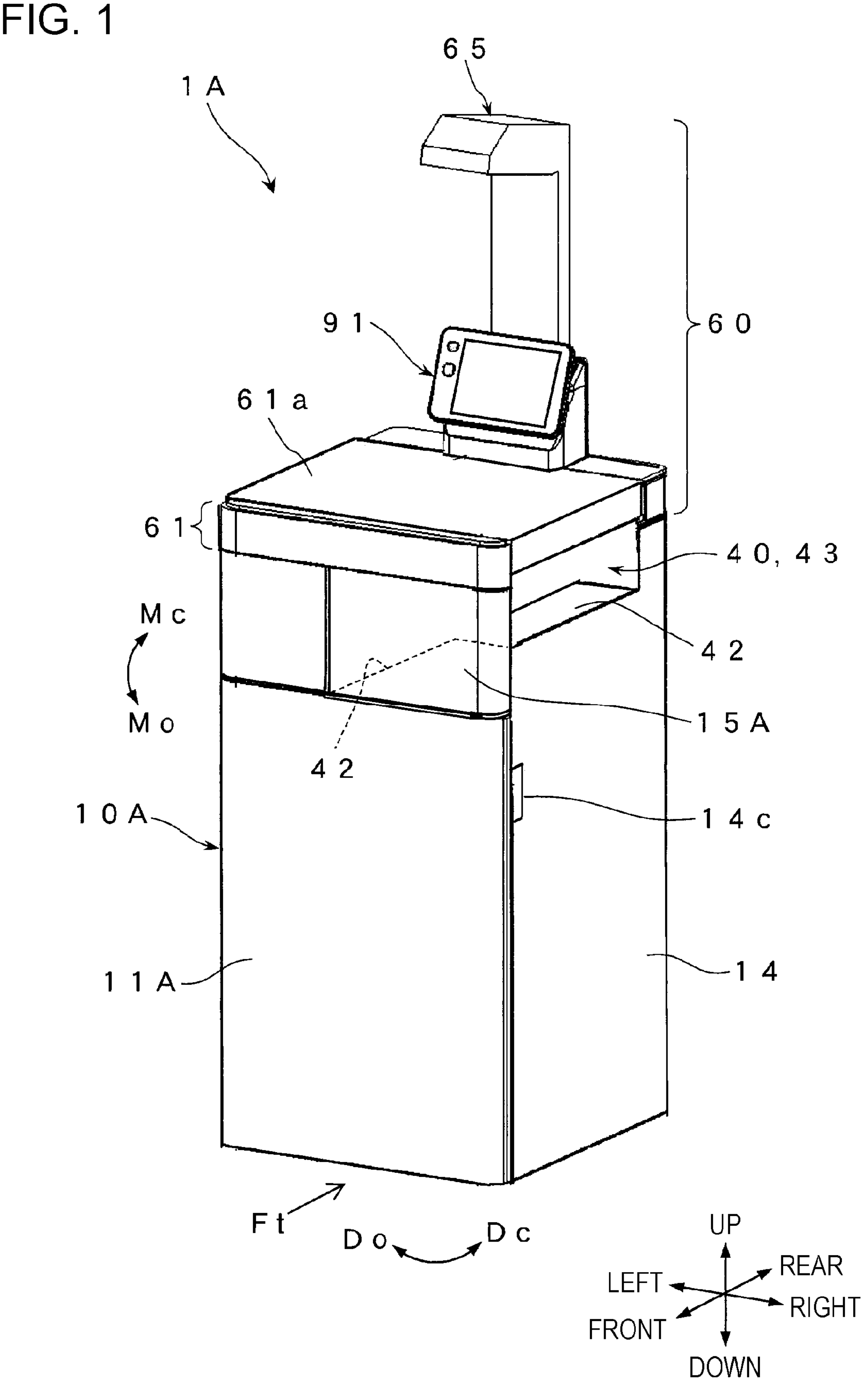
FIG. 1 is a perspective view of an image forming apparatus according to a first exemplary embodiment.
Figure 2:
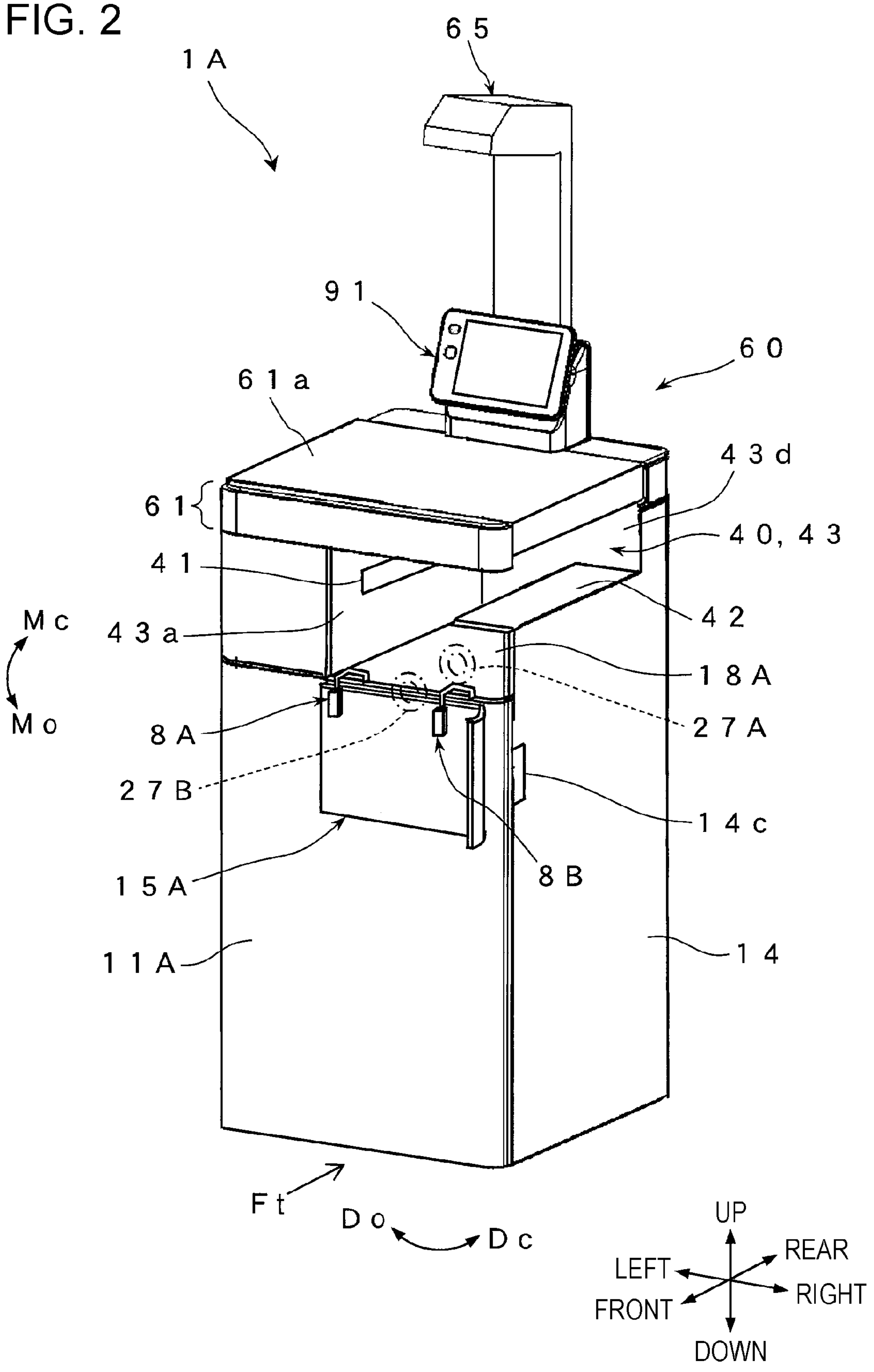
FIG. 2 is a perspective view illustrating a state where a first opening and closing covering of the image forming apparatus of FIG. 1 is opened.
Figure 3:
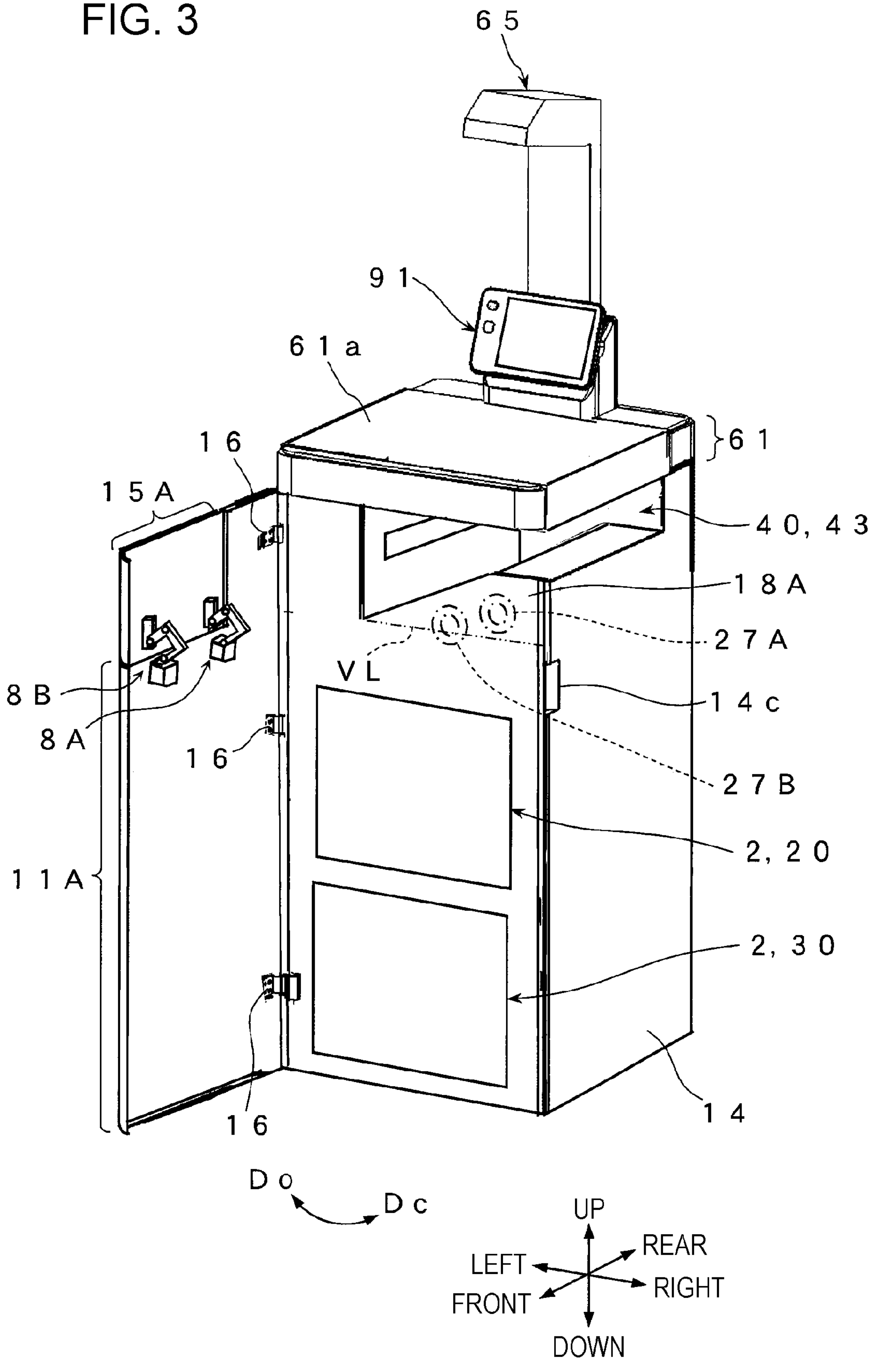
FIG. 3 is a perspective view illustrating a state where a second opening and closing covering of the image forming apparatus of FIG. 1 is opened.

FIG. 1 is a perspective view of an image forming apparatus 1A according to a first exemplary embodiment of the present disclosure viewed from a diagonally front side thereof. FIG. 2 is a perspective view illustrating a state where a first opening and closing covering of the image forming apparatus 1A is opened. FIG. 3 is a perspective view illustrating a state where a second opening and closing covering of the image forming apparatus 1A is opened.

Up-down, left-right, and front-rear directions indicated by arrows in the drawings such as FIG. 1 are directions based on a front face Ft of the image forming apparatus 1A which a user who uses the image forming apparatus 1A is assumed to face while standing.

As illustrated in any of FIGS. 1 to 3, the image forming apparatus 1A according to the first exemplary embodiment includes a housing 10A, an image forming part 2, a medium discharge part 40, and an external reading part 60, which are disposed inside or outside the housing 10A, and a first opening and closing covering 15A and a second opening and closing covering 11A that are opened and closed to cover predetermined parts of a front face of the housing 10A. The second opening and closing covering 11A is an example of a second covering and is an openable closable covering.

The housing 10A is a structure that has an inner skeletal part and an outer exterior part and has predetermined structure and shape made of materials such as plural frames and exterior coverings.

As illustrated in FIG. 1, the housing 10A according to the first exemplary embodiment is a structure having a rectangular parallelepiped shape that is long in the up-down direction in appearance.

The exterior part of the housing 10A is, for example, constituted by exterior coverings such as the second opening and closing covering 11A and the first opening and closing covering 15A that constitute a front face opening and closing covering, a rear face covering, a left side face opening and closing covering, and a right side face covering 14. Among these exterior coverings, exterior coverings such as the rear face covering and the right side face covering 14 are, for example, unopenable coverings that are not openable and are fixedly attached. The exterior coverings are non-transparent coverings (coverings that cannot be seen through from an outside) unless otherwise specified.

Details of the second opening and closing covering 11A and the first opening and closing covering 15A will be described later.

The image forming part 2 is a part that has a device for forming an image on a recording medium 9.

Figure 4:
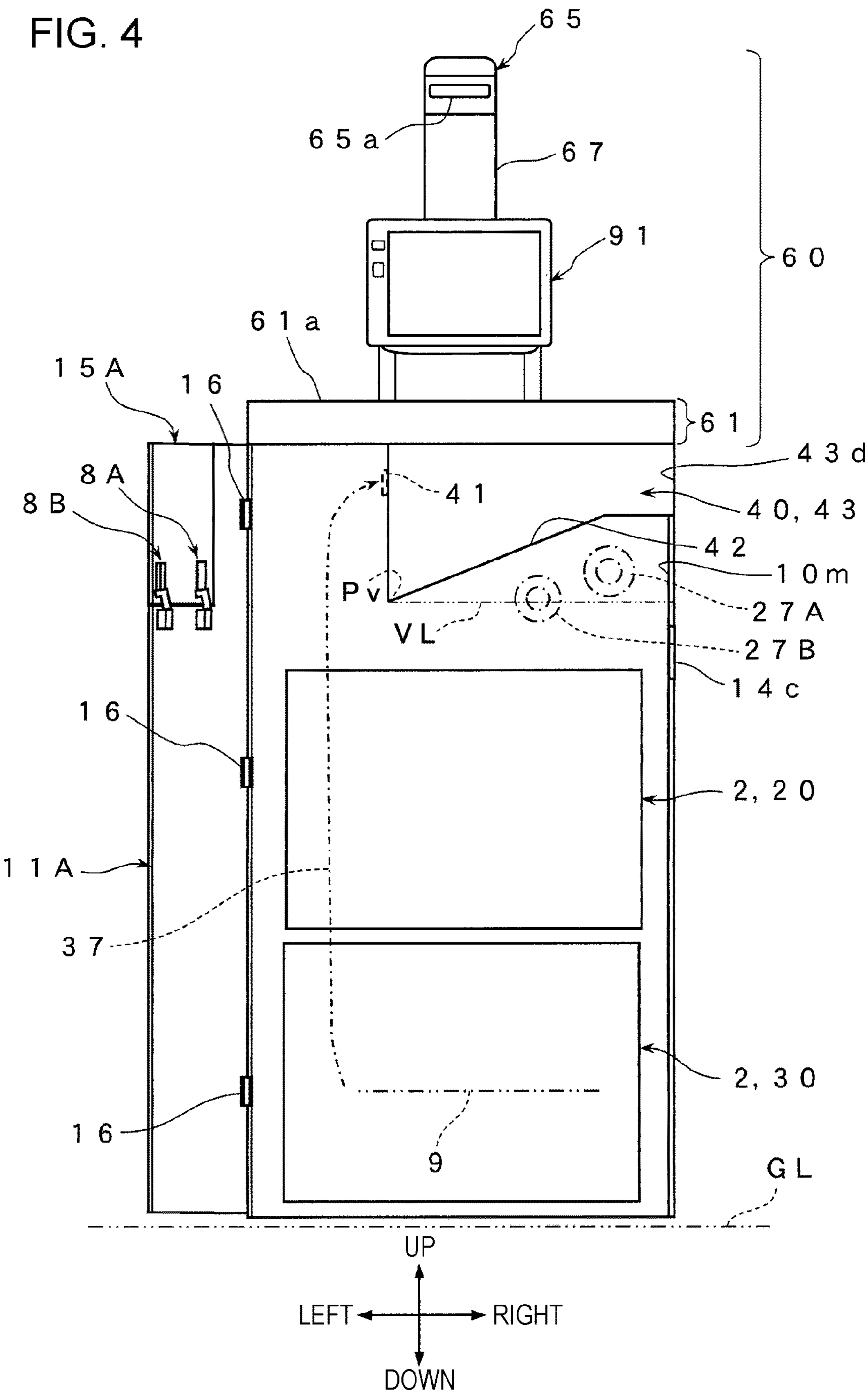
FIG. 4 is a front face schematic view illustrating a state where the second opening and closing covering of the image forming apparatus of FIG. 1 is opened.

As illustrated in FIG. 3 or 4, the image forming part 2 according to the first exemplary embodiment has an image generating part 20 that generates an image and forms the image on a recording medium 9 and a medium feeding part 30 that stores therein a recording medium 9 used in the image generating part 20 and feeds the recording medium 9 to the image generating part 20. Although it can be said that the image generating part 20 includes the medium discharge part 40 from a functional perspective, it is assumed that the image generating part 20 does not include the medium discharge part 40 in this example for convenience. The recording medium 9 is, for example, a medium such as sheet-shaped plain paper, coated paper, or cardboard having a predetermined size.

The image generating part 20 of the image forming part 2 is constituted by an electrophotographic-system image generating device that forms an image made of a developer finally on a recording medium 9.

The image generating part 20 constituted by the electrophotographic-system image generating device includes an image carrier such as a photoreceptor having a surface on which an image is held, devices such as a charging device, an exposure device, a developing device, and a transfer device that are disposed around the image carrier, and a fixation device disposed apart from the image carrier, any of which is not illustrated. Furthermore, the image generating part 20 includes devices such as a developer supplying device, an image processing device, and a control device. The transfer device is a direct transfer type device that directly transfers an image made of a developer formed on the image carrier onto a recording medium 9 or an intermediate transfer type device that transfers the image from the image carrier onto an intermediate transfer body and then onto a recording medium 9.

The image generating part 20 has a function of forming an image according to image information input from an external device such as an information terminal connected to the image forming apparatus 1A and a function of forming an image according to image information read by the external reading part 60.

Accordingly, in the image generating part 20, a charging operation, an exposure operation according to image information, a developing operation, and a transfer operation, which are performed mainly on the image carrier in the image generating device, are performed in this order. Through these operations, in the image generating part 20, an image made of a developer is formed on the image carrier, and then the image is transferred from the image carrier onto a recording medium 9. Furthermore, in the image generating part 20, a fixation operation is performed on the recording medium 9 onto which the image has been transferred, and thereby the image is fixed on the recording medium 9.

The medium feeding part 30 of the image forming part 2 is disposed below the image generating part 20. The medium feeding part 30 includes devices such as a storage such as a tray in which a recording medium 9 is stored and a feeding device that feeds the recording medium 9 out from the storage, any of which is not illustrated.

The storage is attached so as to be drawable from an inner side to an outer side of the housing 10A, and thereby work such as work for storing a recording medium 9 may be performed. A single storage may be provided or plural storages may be provided. As many feeding devices as the storage(s) are disposed.

In the medium feeding part 30, a predetermined recording medium 9 is fed toward the image generating part 20 in synchronization with a transfer operation in the image generating part 20. The recording medium 9 is transported through a medium transport path 37 (see FIG. 4) from the medium feeding part 30 to a discharge opening 41 by passing through a part (a part that transfers an image on the recording medium 9) of the image generating part 20.

Next, the medium discharge part 40 is a part to which a recording medium 9 on which an image has been formed by the image forming part 2 is discharged.

This medium discharge part 40 is disposed above the image generating part 20. Furthermore, the medium discharge part 40 has a discharge space 43 in a part of an upper part of a front part of the housing 10A. As illustrated in FIG. 2, the discharge space 43 is a space that is opened to an outside through a front face opening 43*a* opened at a position off-centered toward a right side and a side face opening 43*d* opened on a right face so as to be continuous from the front part.

The medium discharge part 40 has, on a left inner wall surface of the discharge space 43, the discharge opening 41 through which a recording medium 9 is discharged. Furthermore, the medium discharge part 40 has, on a bottom surface of the discharge space 43, a stacking surface part 42 on which a recording medium 9 discharged from the discharge opening 41 is stacked. The stacking surface part 42 is, for example, a surface that is inclined so as to ascend from the discharge opening 41 toward a right side, that is, a rightwardly ascending surface.

In the medium discharge part 40, when an image is formed on a recording medium 9 in the image generating part 20, the recording medium 9 on which the image has been formed is transported through the medium transport path 37 and is then discharged from the discharge opening 41 and stored.

Next, the external reading part 60 is a reading part that reads an object to be read outside (above in this example) the housing 10A.

As illustrated in FIG. 1 and other drawings, the external reading part 60 includes structural parts and devices such as a table part 61 on which an object to be read is placed and a reading device part 65 that reads the object to be read placed on the table part 61.

The table part 61 is a plate-shaped member having a flat upper surface part 61*a* on which an object to be read can be placed at rest. Furthermore, the table part 61 is attached to an upper end of the housing 10A so that the upper surface part 61*a* thereof becomes a topmost surface of the housing 10A.

The object to be read may be any object that can be placed on the table part 61 and read from above the table part 61 by the reading device part 65, and examples of the object to be read include not only a sheet-shaped document on which image information is recorded, but also three-dimensional objects such as a book, a magazine, a piece of food, and a plant.

As illustrated in FIG. 4, the reading device part 65 includes a reading device 65*a* that is capable of optically reading an object to be read placed on the table part 61 and a member for attachment of the reading device 65*a* that supports the reading device 65*a*. The reading device part 65 according to the first exemplary embodiment is attached at such a posture that the reading device 65*a* is supported by a support part 67 so as to be raised upward by a predetermined length from a rear end side of the table part 61 and is thus capable of reading a side where the table part 61 is provided.

The reading device 65*a* is, for example, a camera that combines an imaging element such as a charge coupled device (CCD) and an optical element such as a lens. The camera used as the reading device 65*a* is sometimes called a document camera. The reading device part 65 may include an illuminating device that illuminates an object to be read placed on the table part 61 when the reading device part 65 reads the object to be read.

As illustrated in FIG. 1 and other drawings, the reading device part 65 includes an operation panel 91 for operation of the image forming apparatus 1A on a base and near side of a member that supports the reading device 65*a*. The operation panel 91 is disposed at a position separated upward from the table part 61, for example, from the perspective of improvement of operability. Although the operation panel 91 mainly has a display part such as a touch-type liquid crystal panel that can display an operation screen and that can be operated, the operation panel 91 may include a mechanical operation part such as a button.

Next, the second opening and closing covering 11A of the image forming apparatus 1A is described.

As illustrated in FIGS. 1 to 3 and other drawings, the second opening and closing covering 11A is an opening and closing covering that can cover at least a part of the front face of the housing 10A excluding a part covered with the first opening and closing covering 15A and including the image forming part 2.

The part including the image forming part 2 according to the first exemplary embodiment is a part including the image generating part 20, the medium feeding part 30, and the medium transport path 37.

Although the table part 61 of the external reading part 60 forms an upper end part including the front face of the housing 10A, the table part 61 of the external reading part 60 is handled as a part that is not included in the front face of the housing 10A. It is assumed that an upper end part is a part of a target region such as a surface from an upper end to a position leading to a lower position of an upper $1/10$ region or to the lower position.

An entire shape of the second opening and closing covering 11A is a shape corresponding to a part of the front face of the housing 10A that is below the table part 61 and excluding the part covered with the first opening and closing covering 15A.

In other words, the entire shape of the second opening and closing covering 11A is an oblong shape that is long in the up-down direction and has a cutout part cut out in a shape of the part covered with the first opening and closing covering 15A. As illustrated in FIG. 2, the shape of the part covered with the first opening and closing covering 15A is a horizontally-long oblong shape combining the front face opening 43*a* of the medium discharge part 40 and a front face part 18A directly below the front face opening 43*a*.

Furthermore, an outer surface 11Aa (see FIG. 5) of the second opening and closing covering 11A is a flat surface except for curved surface parts curved backward at left and right ends thereof. At least a part of the second opening and closing covering 11A that faces the opened first opening and closing covering 15A is a flat surface. Note that the part that faces the opened first opening and closing covering 15A may include a part recessed backward or a part curved backward.

The second opening and closing covering 11A is disposed almost perpendicularly to an installation surface GL (see FIG. 4) on which the image forming apparatus 1A is installed and has a shape that is longer in the up-down direction than the first opening and closing covering 15A.

The "almost perpendicularly" refers to a state within a range of approximately 10° on a front side or a rear side from a state perpendicular to the installation surface (a state of 90° or a state along a direction of gravitational force).

Furthermore, as illustrated in FIG. 3 and other drawings, the second opening and closing covering 11A is attached so to open and close in directions indicated by arrows Do and Dc on plural (three in this example) second opening closing support members 16 such as hinges at a left end of the front face of the housing 10A. Accordingly, the whole second opening and closing covering 11A opens in a laterally leftward direction (direction indicated by arrow Do).

The right side face covering 14 has, at an end on the front side, a handle guide recessed part 14*c*, as illustrated in FIGS. 1 and 3 and other drawings. The handle guide recessed part 14*c* is a part that has a recessed shape for guiding a user's finger so that a user can easily catch a handle part of the second opening and closing covering 11A when opening the second opening and closing covering 11A.

Next, the first opening and closing covering 15A of the image forming apparatus 1A is described.

As illustrated in FIGS. 1 and 2 and other drawings, the first opening and closing covering 15A is a partial opening and closing covering of the front face of the housing 10A that is opened and closed so as to cover a part including a part of the front face opening 43*a* of the medium discharge part 40.

Figure 11:
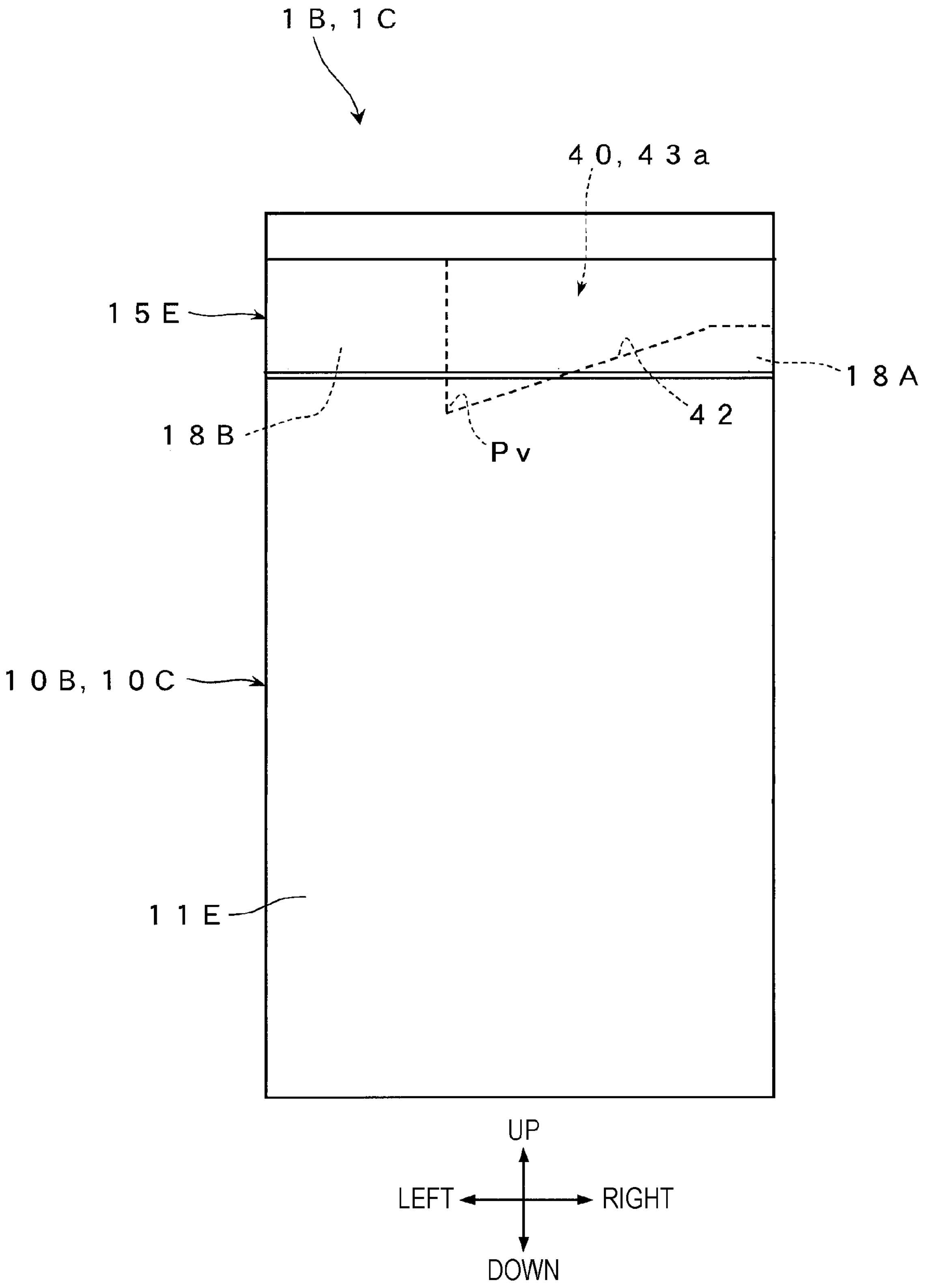
FIG. 11 is a front face schematic view illustrating another example of a configuration of the first opening and closing covering and the second opening and closing covering.

The part of the front face opening 43*a* of the medium discharge part 40 is a part that occupies approximately 80% of the whole front face opening 43*a*. The first opening and closing covering 15A configured to cover the part of the front face opening 43*a* of the medium discharge part 40 will be described later (FIG. 11).

As illustrated in any of FIGS. 2 and 5 and other drawings, the first opening and closing covering 15A is attached so that a lower end part 15*v* thereof in a closed state is connected to an upper part of the second opening and closing covering 11A by opening closing support members 8, and is thereby the first opening and closing covering 15A is openable to such an extent that the first opening and closing covering 15A becomes close to or makes contact with the outer surface 11Aa of the second opening and closing covering 11A.

It is assumed that the upper part of the second opening and closing covering 11A is a part from a center in the up-down direction to an upper end of a target region. It is assumed that the upper part of the second opening and closing covering 11A according to the first exemplary embodiment is an upper end of the cutout part of the second opening and closing covering 11A, as illustrated in FIG. 2 and other drawings.

Furthermore, the opening closing support member 8 applied to the first opening and closing covering 15A is used to connect the lower end part 15*v* of the closed first opening and closing covering 15A and the upper part of the second opening and closing covering 11A and therefore functions as a lower hinge.

Furthermore, the state where the first opening and closing covering 15A is close to the surface of the second opening and closing covering 11A is a state where at least a lower end part of the opened first opening and closing covering 15A (actually, an upper end part 15*t* of the closed first opening and closing covering 15A) is close to but is not in contact with the outer surface 11Aa of the second opening and closing covering 11A.

Furthermore, the state where the first opening and closing covering 15A is in contact with the surface of the second opening and closing covering 11A is a state where at least the lower end part of the opened first opening and closing covering 15A is in contact with the outer surface 11Aa of the second opening and closing covering 11A.

Figure 5A:
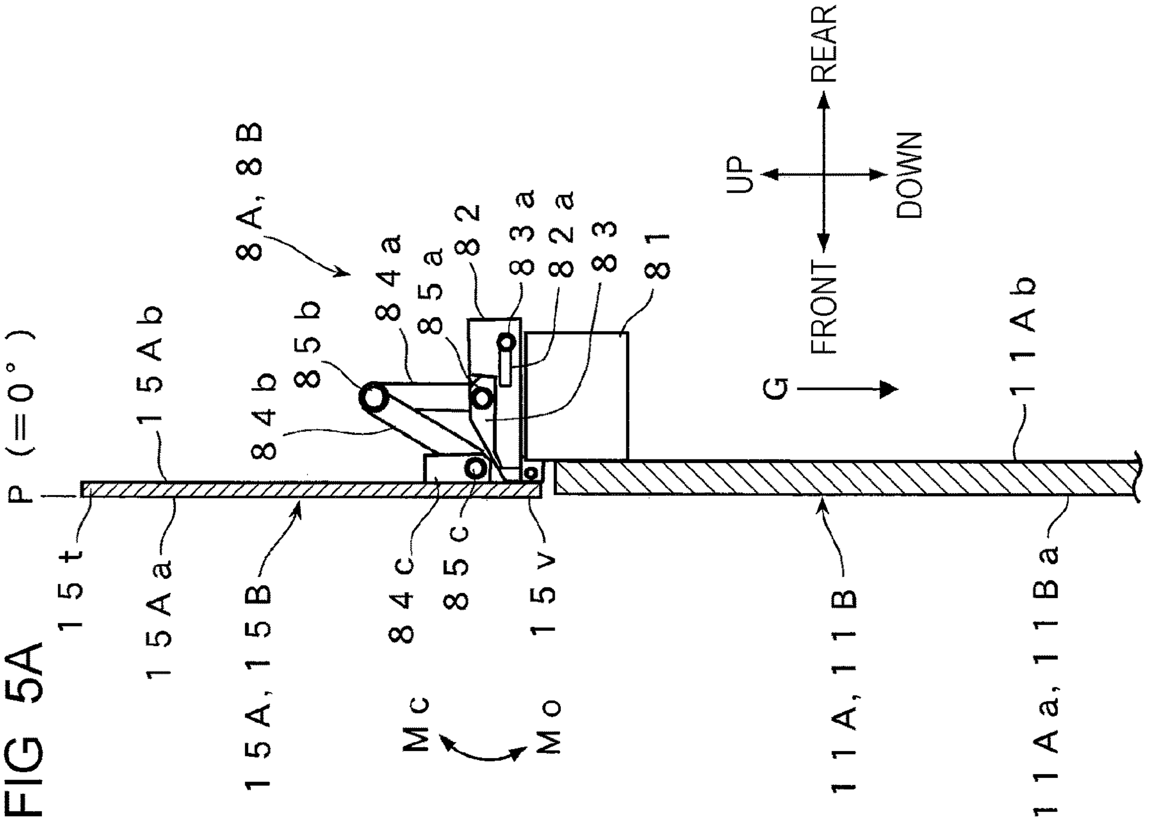
FIG. 5A is a schematic cross-sectional view illustrating members such as an opening closing support member in a state where the first opening and closing covering is closed.
Figure 5B:
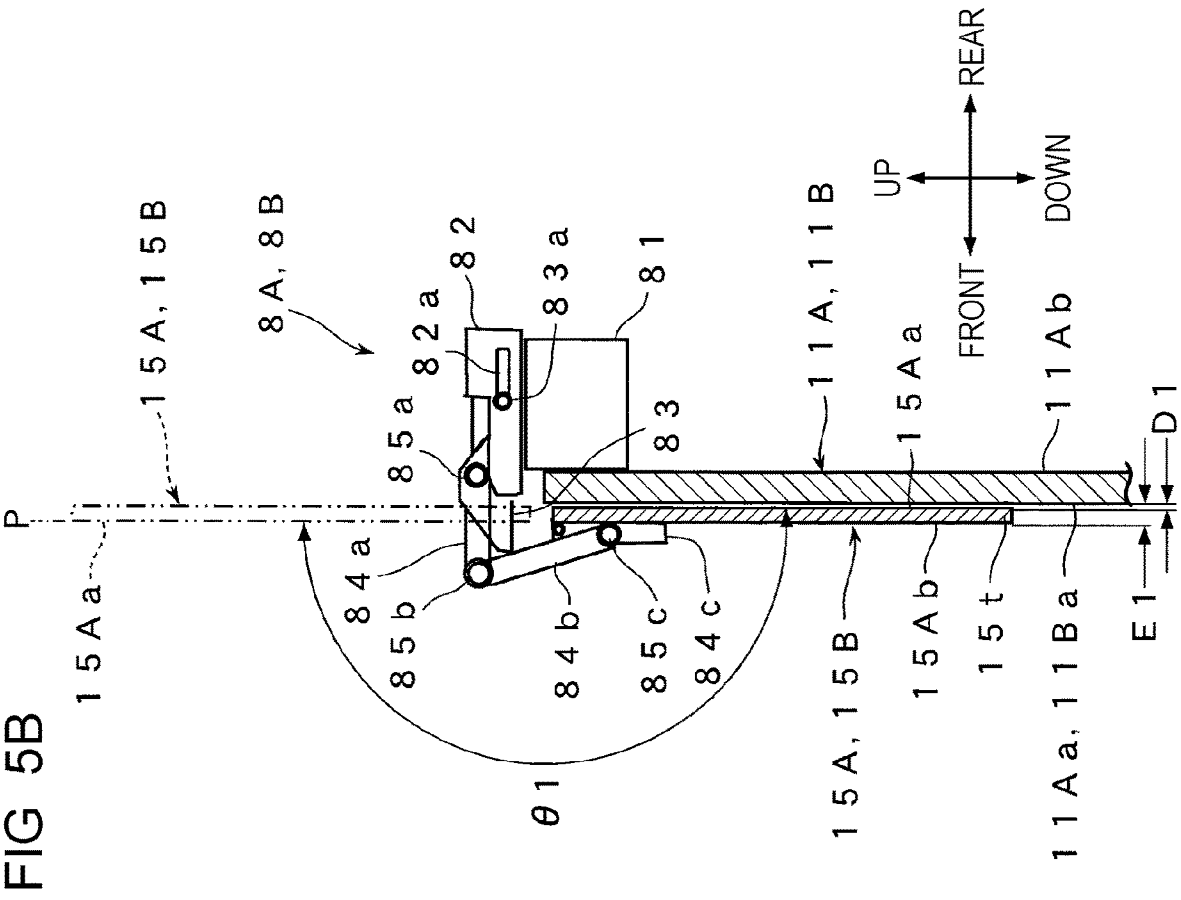
FIG. 5B is a schematic cross-sectional view illustrating members such as an opening closing support member in a state where the first opening and closing covering is opened.

As illustrated in FIG. 5B and other drawings, the first opening and closing covering 15A is attached by being supported by the opening closing support member 8 so as to be openable to such an extent that a distance D1 between the lower end part 15*t* of the opened first opening and closing covering 15A and the second opening and closing covering 11A becomes 10 mm or less. With this configuration, the first opening and closing covering 15A is openable to such an extent that the first opening and closing covering 15A becomes close to or makes contact with the outer surface 11Aa of the second opening and closing covering 11A.

In this case, if the first opening and closing covering 15A is configured to be openable to such an extent that the distance D exceeds 10 mm, a user's hand taking a recording medium 9 out from the medium discharge part 40 may hit the first opening and closing covering 15A, and it is therefore hard to take out a recording medium 9 discharged to the medium discharge part 40.

As for the risk of hitting of a user's hand, a user's hand taking out a recording medium 9 often draws a trajectory extending from a lower side toward the medium discharge part 40. This increases a possibility that this trajectory crosses the first opening and closing covering 15A opened on the lower hinge, thereby increasing a possibility that the user's hand hits the opened first opening and closing covering 15A.

In other words, the first opening and closing covering 15A is attached by the opening closing support member 8 so as to open at an angle θ1 within a range of 170° to 180° from a closed posture thereof toward a near side with respect to the front face of the housing 10A, as illustrated in FIG. 5B and other drawings. Also in this case, the first opening and closing covering 15A is openable to such an extent that the first opening and closing covering 15A becomes close to or makes contact with the outer surface 11Aa of the second opening and closing covering 11A.

As illustrated in FIG. 5B, the angle θ1 is an angle to an outer surface 15Aa of the first opening and closing covering 15A opened toward the front face of the housing 10A when a position of the outer surface 15Aa of the closed first opening and closing covering 15A or a position directly above a direction D of gravitational force is 0° (closed position P). The range of 170° to 180° is a range of not less than 170° and not more than 180°.

In this case, if the first opening and closing covering 15A is configured to be openable to such an extent that the angle θ1 becomes 150° or less, a user's hand taking a recording medium 9 out from the medium discharge part 40 may hit the first opening and closing covering 15A, and it is therefore hard to take out a recording medium 9 discharged to the medium discharge part 40.

An entire outer appearance shape of the first opening and closing covering 15A according to the first exemplary embodiment is an almost rectangular shape (strictly, a horizontally-long almost oblong shape). The outer surface 15Aa of the first opening and closing covering 15A is an almost flat surface excluding a surface part curved backward at a right end part thereof.

Accordingly, the first opening and closing covering 15A can cover the whole front face opening 43*a* of the medium discharge part 40 and the front face part 18A continuous directly below the front face opening 43*a* on the front face of the housing 10A.

As illustrated in FIG. 4 and other drawings, an entire shape of the front face opening 43*a* of the medium discharge part 40 according to the first exemplary embodiment is a horizontally-long oblong shape whose lower end has been changed to a shape of the stacking surface part 42 of the recording medium 9 that is seen from the front face side.

Specifically, the shape of the stacking surface part 42 that is seen from the front face side is a line shape combining a line along the rightwardly-ascending inclined surface and a line extending almost horizontally from a right upper end of the inclination to a right end of the housing 10A. In other words, the shape of the front face opening 43*a* is a shape combining a trapezoid on the left side and a quadrangle on the right side.

Furthermore, the front face part 18A of the housing 10A is a part whose entire shape is an almost trapezoidal shape surrounded by a lower side part of the front face opening 43*a* of the medium discharge part 40, a virtual horizontal line VL extending from a lowermost part Pv of the front face opening 43*a* in the left-right direction, and a right end part 10*m* of the housing 10A, as illustrated in FIG. 4 and other drawings.

The front face part 18A is a part that does not need to be opened and closed unlike a part (the medium discharge part 40) that needs to be opened and closed by being covered with the first opening and closing covering 15A.

Furthermore, the lower end part 15*v* of the first opening and closing covering 15A is connected to the upper part of the second opening and closing covering 11A by the opening closing support member 8 that supports the first opening and closing covering 15A so as to open the first opening and closing covering 15A toward the near side with respect to the front face of the housing 10A by rotating in a direction indicated by arrows Mo and Mc about at least one moving shaft, as illustrated in FIGS. 2, 4, 5A, and 5B, and other drawings.

In this case, the opening closing support member 8 is attached so as to be disposed on an inner side surface of the closed first opening and closing covering 15A and an inner side surface of the second opening and closing covering 11A. The inner side surface of the first opening and closing covering 15A and the inner side surface of the second opening and closing covering 11A are inner surfaces 15Ab and 11Ab opposite to the outer surfaces 15Aa and 11Aa of the closed opening and closing coverings 15A and 11A, as illustrated in FIG. 5A.

In the first exemplary embodiment, left and right opening closing support members 8A and 8B disposed at different positions separated in the left-right direction are applied as the opening closing support member 8.

As illustrated in FIGS. 5A and 5B, each of the left and right opening closing support members 8A and 8B includes a pedestal 81, a body part 82, a sliding part 83, three links 84*a*, 84*b*, and 84*c*, and three shafts 85*a*, 85*b*, and 85*c*.

The pedestal 81 is fixedly attached to the inner surface 11Ab of the second opening and closing covering 11A that serves as a support. This pedestal 81 is, for example, a bracket-type frame, but may be a part formed as a part of the second opening and closing covering 11A.

The body part 82 is a part fixedly attached to an upper surface of the pedestal 81.

The sliding part 83 is a part that slides by a predetermined distance so as to protrude forward relative to the body part 82. The sliding part 83 is formed as a component that is guided to move and is restricted to move in a state where a pin 83*a* protruding from left and right side surfaces thereof is fitted in a slide hole 82*a* that is formed in the body part 82 and is long in the front-rear direction.

The shafts 85*a*, 85*b*, and 85*c* are shafts that rotatably connect base parts and a coupling part of the links 84*a*, 84*b*, and 84*c*.

The first shaft 85*a* is disposed on a shaft bearing of the sliding part 83 so as to connect the base part of the link 84*a*. The second shaft 85*b* is disposed on a shaft bearing of each end part (coupling part) of the link 84*a* and the link 84*b* so as to connect the link 84*a* and the link 84*b*. The third shaft 85*c* is disposed on the shaft bearing of the link 84*c* so as to connect the base part of the link 84*b*.

Each of the shafts 85*a*, 85*b*, and 85*c* is a shaft that moves (is displaced) when the first opening and closing covering 15A is opened and closed.

The links 84*a*, 84*b*, and 84*c* are links having a three-joint open loop structure rotatably extending relative to the sliding part 83.

The first link 84*a* is attached rotatably about the first shaft 85*a* so that one end part thereof rises above the sliding part 83. The second link 84*b* is configured such that one end part thereof is connected to the other end part of the first link 84*a* rotatably about the second shaft 85*b* and the other end part thereof is connected to the third link 84*c* rotatably about the third shaft 85*c*. The third link 84*c* is fixedly attached to the lower end part 15*v* on the inner side of the first opening and closing covering 15A, and the other end part of the second link 84*b* is attached to the third link 84*c* rotatably about the third shaft 85*c*.

The links 84*a*, 84*b*, and 84*c* are configured such that postures thereof are maintained when the first opening and closing covering 15A is closed or opened, unless a next action for opening or closing the first opening and closing covering 15A is received.

The first opening and closing covering 15A in the closed state is upright almost perpendicularly above an upper end of the cutout part of the second opening and closing covering 11A, as illustrated in FIG. 5A.

In this state, the first opening and closing covering 15A is held by being supported by the left and right opening closing support members 8A and 8B so that the outer surface 15Aa is almost flush with the outer surface 11Aa of the second opening and closing covering 11A.

In this state, the left and right opening closing support members 8A and 8B are in such a state that the sliding part 83 recedes to be stored in the body part 82. Furthermore, in this state, the opening closing support members 8A and 8B are in such a state that the first link 84*a*, the second link 84*b*, and the third link 84*c* are bent in a V shape at the second shaft 85*b* and the third shaft 85*c* above the sliding part 83 so as to be alternately folded back.

Furthermore, in this state, the opening closing support members 8A and 8B are disposed on the inner side of the first opening and closing covering 15A and the inner side of the second opening and closing covering 11A and therefore cannot seen from the front face Ft side of the apparatus (see FIG. 1).

The first opening and closing covering 15A in the opened state is held close to or in contact with the outer surface 11Aa of the second opening and closing covering 11A in a state where the upper end part 15*t* in the closed state is located on a lower side and the lower end part 15*v* in the closed state is located on an upper side (in other words, in a state where front and rear surfaces are reversed) at the upper end of the cutout part of the second opening and closing covering 11A, as illustrated in FIG. 5B.

In this state, the first opening and closing covering 15A is held while being supported by the left and right opening closing support members 8A and 8B so that the outer surface 15Aa is close to or in contact with the outer surface 11Aa of the second opening and closing covering 11A.

In this state, the left and right opening closing support members 8A and 8B are in such a state that the sliding part 83 protrudes from the body part 82 and the first link 84*a* has rotated about the first shaft 85*a* and fallen forward from the sliding part 83 and is maintained at an almost horizontal posture. In this state, the first shaft 85*a* is displaced forward in accordance with the movement of the sliding part 83, and the second shaft 85*b* is displaced so as to descend forward in accordance with the movement of the sliding part 83 and the change in posture of the first link 84*a*.

Furthermore, in this state, the left and right opening closing support members 8A and 8B are in such a state that the second link 84*b* has rotated about the second shaft 85*b* and is inclined from the other end part of the fallen first link 84*a* toward the outer surface 11Aa of the second opening and closing covering 11A. In this state, the third shaft 85*c* is displaced so as to descend forward in accordance with the change in postures of the second link 84*b* and the third link 84*c*.

Furthermore, in this state, the left and right opening closing support members 8A and 8B are in such a state that the third link 84*c* has rotated by almost 180° about the third shaft 85*c* at the other end part of the second link 84*b* and is close to the outer surface 11Aa of the second opening and closing covering 11A. The first opening and closing covering 15A is substantially rotated about the moving third shaft 85*c* to be opened.

In this state, the left and right opening closing support members 8A and 8B are in such a state that the second link 84*b* and the third link 84*c* can be seen from the front face Ft side of the apparatus (see FIGS. 2 and 5B).

Furthermore, in this state, the left and right opening closing support members 8A and 8B are in such a state that the second shaft 85*b*, the third shaft 85*c*, and the shaft bearings thereof (not illustrated) are located on the near Ft side of the apparatus toward the user relative to the second opening and closing covering 11A, as illustrated in FIG. 5B.

As illustrated in FIG. 1, the image forming apparatus 1A configured as above is configured such that when the second opening and closing covering 11A and the first opening and closing covering 15A are closed, a part including at least the image forming part 2 and the front face opening 43*a* of the medium discharge part 40 on the front face of the housing 10A is covered with the second opening and closing covering 11A and first opening and closing covering 15A, which are non-transparent.

With this configuration, in a case where the image forming apparatus 1A is not used, for example, in a case where operations such as an image formation operation and an external reading operation are not performed, the medium discharge part 40 (the front face opening 43*a*) is not viewable from the front face side of the housing 10A. As a result, the image forming apparatus 1A may obtain neat outer appearance without the presence of the medium discharge part 40 when viewed from the near side with respect to the front face of the housing 10A.

Furthermore, for example, in a case where the image forming apparatus 1A is used to perform an operation such as an image formation operation, only the first opening and closing covering 15A can be opened to the near side with respect to the front face Ft of the apparatus while closing the second opening and closing covering 11A, as illustrated in FIG. 2.

This causes the image forming apparatus 1A to be in a state in which at least the whole front face opening 43*a* of the medium discharge part 40 and the front face part 18A are opened to an outside on the front face of the housing 10A. As a result, when a recording medium 9 on which an image has been formed by the image formation operation is discharged to the medium discharge part 40, a user may take out the discharged recording medium 9 from the medium discharge part 40 by inserting his or her hand, for example, from the front face opening 43*a* of the medium discharge part 40.

In the image forming apparatus 1A, when the first opening and closing covering 15A is opened, the first opening and closing covering 15A is opened to such an extent that the outer surface 15Aa of the first opening and closing covering 15A becomes close to or makes contact with the outer surface 11Aa of the second opening and closing covering 11A so that the above conditions are met, as illustrated in FIGS. 2 and 5B.

Figure 13:
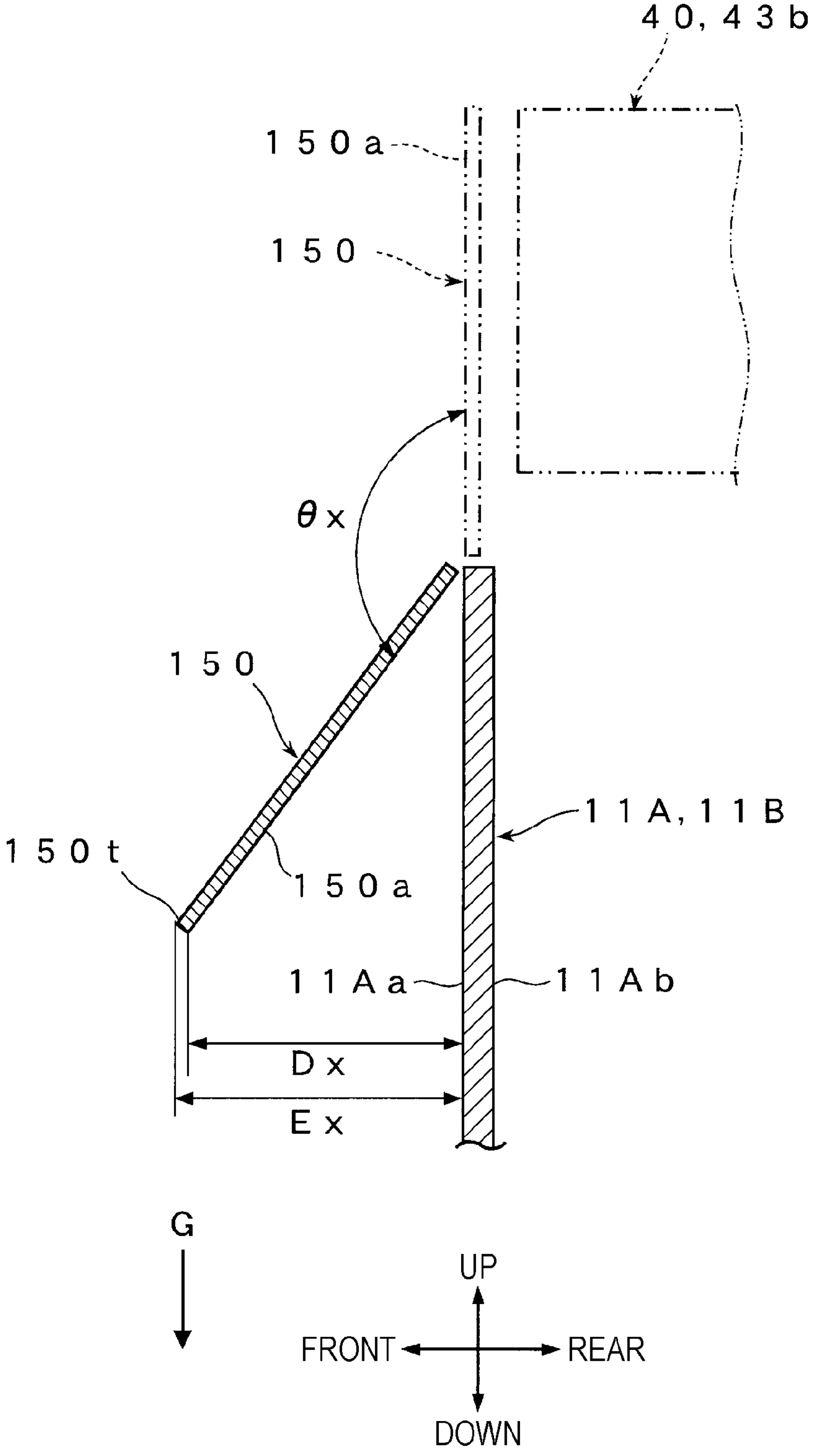
FIG. 13 is a schematic cross-sectional view illustrating a state where a first opening and closing covering that opens about a lower hinge is opened according to Comparative Example 1.

Accordingly, as illustrated in FIG. 5B, an amount E1 by which the opened first opening and closing covering 15A protrudes toward the near side with respect to the front face Ft of the apparatus from the outer surface 11Aa of the second opening and closing covering 11A markedly decreases, for example, as compared with an example of a configuration (protruding amount Ex) concerning a first opening and closing covering 150 and others according to Comparative Example 1 illustrated in FIG. 13.

In this case, the protruding amount E1 is a maximum distance between the outer surface 11Aa of the second opening and closing covering 11A and the inner surface 15Ab of the first opening and closing covering 15A. Comparative Example 1 illustrated in FIG. 13 is an example of a configuration in which the first opening and closing covering 150 supported by a lower hinge is opened only at an angle θx within a range of approximately 90° to 150° toward the near side with respect to the front face from a position of 0° (closed position P), which is a closed posture of the first opening and closing covering 150 or a position directly above the direction G of gravitational force.

Accordingly, in the image forming apparatus 1A, the amount E1 by which the opened first opening and closing covering 15A protrudes from the outer surface 11Aa of the second opening and closing covering 11A decreases to a level close to a limit as compared with Comparative Example 1 illustrated in FIG. 13 in which the first opening and closing covering 150 is opened only at the angle θx. Therefore, there is almost no possibility that the first opening and closing covering 15A crosses a trajectory of a hand of a user who is trying to take a recording medium 9 out from the medium discharge part 40. As a result, the image forming apparatus 1A has no risk of a situation where a user's hand hits the opened first opening and closing covering 15A, and the user may easily take out a recording medium 9 discharged to the medium discharge part 40.

Furthermore, as illustrated in FIG. 5B, the left and right opening closing support members 8A and 8B of the image forming apparatus 1A are configured such that the second shaft 85*b*, the third shaft 85*c*, and the shaft bearings thereof (not illustrated) are located on the near side with respect to the front face Ft of the apparatus relative to the second opening and closing covering 11A.

Accordingly, in the image forming apparatus 1A, the first opening and closing covering 15A may be easily opened to become close to or make contact with the outer surface 11Aa of the second opening and closing covering 11A so that the above conditions are met, as compared with a case where the second shaft 85*b* and the third shaft 85*c* of the left and right opening closing support members 8A and 8B and shaft bearings thereof are attached so as not to be located on the near side with respect to the front face Ft of the apparatus relative to the second opening and closing covering 11A when the first opening and closing covering 15A is opened.

Furthermore, the second opening and closing covering 11A of the image forming apparatus 1A is configured such that at least a part thereof that faces the opened first opening and closing covering 15A is a flat surface, as illustrated in FIGS. 1, 2, 5A, and 5B and other drawings.

Accordingly, in the image forming apparatus 1A, at least the part of the second opening and closing covering 11A that faces the first opening and closing covering 15A has nothing to inhibit opening of the first opening and closing covering 15A, and therefore the first opening and closing covering 15A may be easily opened so that the above conditions are met, as compared with a case where the at least the part of the second opening and closing covering 11A that faces the opened first opening and closing covering 15A is a surface having a part protruding, for example, forward from other parts.

In addition, the first opening and closing covering 15A of the image forming apparatus 1A is attached to the second opening and closing covering 11A that is openable and closable.

Accordingly, the image forming apparatus 1A has the following effect in a case where the first opening and closing covering 15A is opened and closed to cover the front face part 18A other than the front face opening 43*a* of the medium discharge part 40 and the front face part 18A needs to be provided with attachment parts for detachable components 27A and 27B. Specifically, even in a case where the attachment part is equipped with the detachable component 27B (see FIG. 2) that cannot be detached just by opening the first opening and closing covering 15A since a part thereof is covered with the second opening and closing covering 11A, the detachable component 27B may be detached by opening the second opening and closing covering 11A (see FIGS. 3 and 4).

The detachable components 27A and 27B are, for example, a developer container in which a developer to be supplied to the image generating part 20 of the image forming part 2 is contained.

Second Exemplary Embodiment

Figure 6:
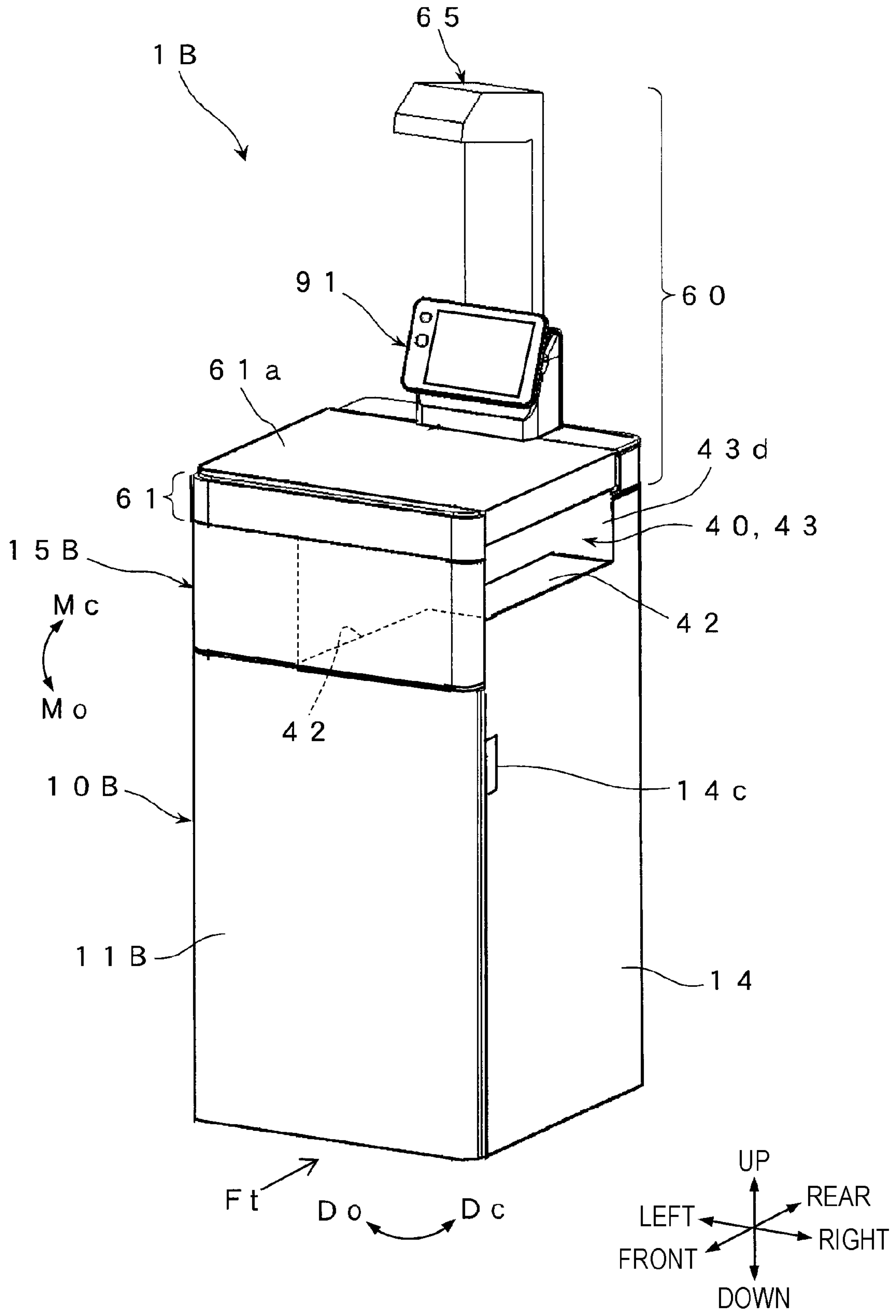
FIG. 6 is a perspective view of an image forming apparatus according to a second exemplary embodiment.
Figure 7:
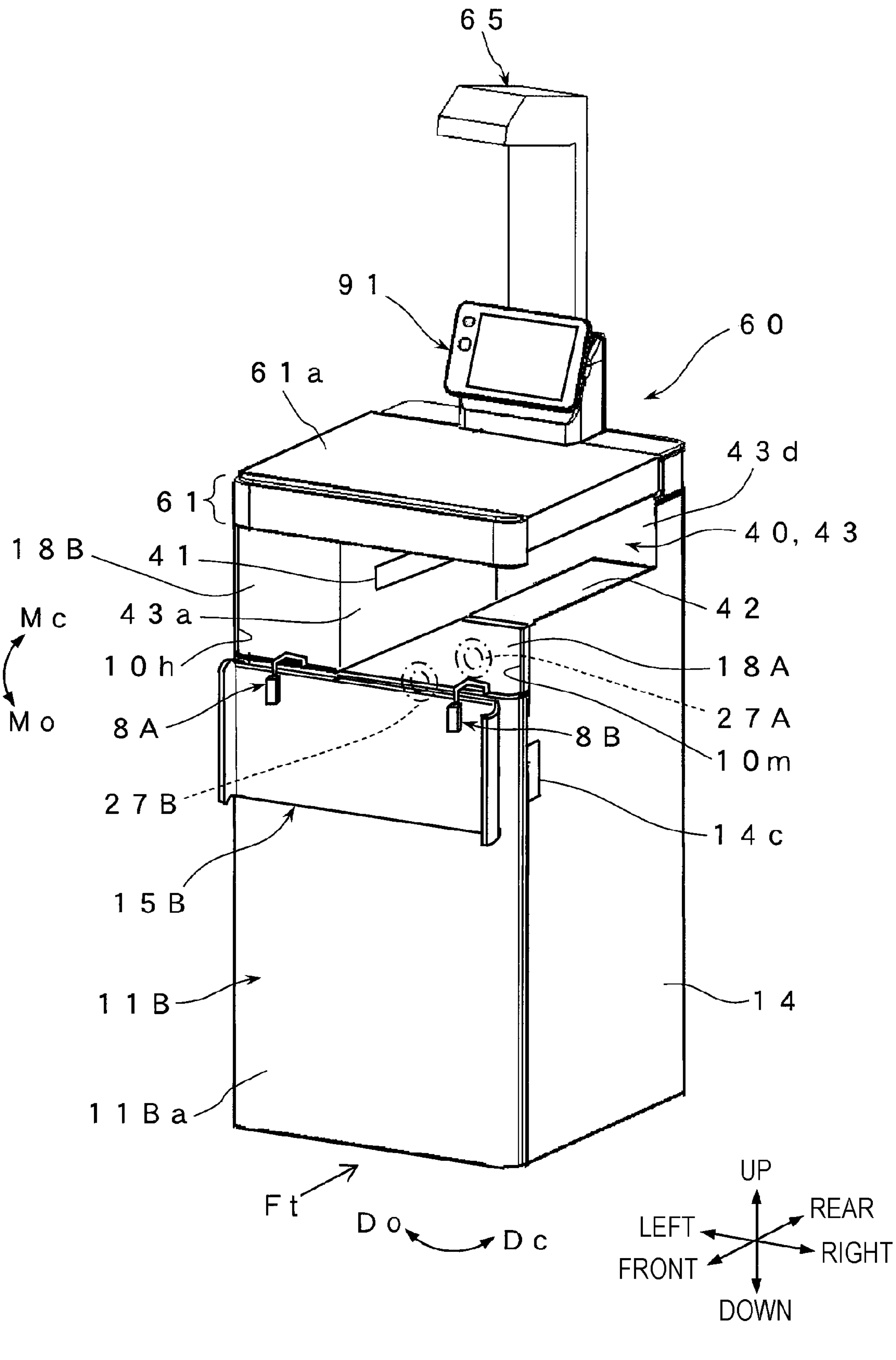
FIG. 7 is a perspective view illustrating a state where a first opening and closing covering of the image forming apparatus of FIG. 6 is opened.

FIG. 6 is a perspective view of an image forming apparatus 1B according to a second exemplary embodiment of the present disclosure viewed from a diagonally front side thereof. FIG. 7 is a perspective view illustrating a state where a first opening and closing covering 15B of the image forming apparatus 1B is opened.

As illustrated in FIGS. 6 and 7, the image forming apparatus 1B according to the second exemplary embodiment has an identical configuration to the image forming apparatus 1A according to the first exemplary embodiment except for that the first opening and closing covering 15B is applied instead of the first opening and closing covering 15A and a second opening and closing covering 11B compatible with the first opening and closing covering 15B is applied. A housing 10B has an identical configuration to the housing 10A according to the first exemplary embodiment except for that the first opening and closing covering 15B and the second opening and closing covering 11B are used.

In the following description, constituent parts identical to those in the first exemplary embodiment are given identical reference signs, and description thereof is omitted except for a case where such description is necessary.

The first opening and closing covering 15B according to the second exemplary embodiment is configured to open and close not only parts (a whole front face opening 43*a* of a medium discharge part 40 and a front face part 18A; see FIG. 2), which are opened and closed by being covered with the first opening and closing covering 15A according to the first exemplary embodiment, but also a second front face part 18B from a left end of the front face opening 43*a* of the medium discharge part 40 of the housing 10B to a left end part of the housing 10B, as illustrated in FIG. 7.

The second front face part 18B is a part whose entire shape is an almost quadrangular shape surrounded by a left end side part of the front face opening 43*a* of the medium discharge part 40, a left end part 10*h* of the housing 10B, an extended line of a virtual horizontal line VL (see FIG. 4) extending from a lowermost part Pv of the front face opening 43*a* in the left-right direction, and a table part 61 of an external reading part 60, as illustrated in FIG. 7.

The second front face part 18B is a part that does not need to be opened and closed unlike a part that needs to be opened and closed by being covered with the first opening and closing covering 15B, as in the case of the front face part 18A. The part that needs to be opened and closed is the front face opening 43*a* of the medium discharge part 40 and the front face part 18A.

Furthermore, as illustrated in FIGS. 6 and 7, the first opening and closing covering 15B is configured as an opening and closing covering whose entire outer appearance shape is an almost rectangular shape. The almost rectangular shape is a horizontally-long almost oblong shape having a length almost identical to a width of the housing 10B.

Accordingly, the first opening and closing covering 15B can cover the front face opening 43*a* of the medium discharge part 40, the front face part 18A directly below the front face opening 43*a*, and the second front face part 18B from the front face opening 43*a* to the left end part 10*h* on the front face of the housing 10B.

As illustrated in FIG. 7, the first opening and closing covering 15B is attached so that a lower end part thereof in a closed state is connected to an upper end of an upper part of the second opening and closing covering 11B by left and right opening closing support members 8A and 8B, and thereby the first opening and closing covering 15B is openable to such extent that the first opening and closing covering 15B becomes close to or makes contact with an outer surface 11Ba of the second opening and closing covering 11B so that conditions similar to those of the first opening and closing covering 15A according to the first exemplary embodiment are met (also see FIG. 5B).

The left and right opening closing support members 8A and 8B are similar to the left and right opening closing support members 8A and 8B according to the first exemplary embodiment and are disposed at different position separated in the left-right direction of the first opening and closing covering 15B.

Next, as illustrated in FIGS. 6 and 7, the second opening and closing covering 11B is configured as an opening and closing covering that can cover a part excluding the parts covered with the first opening and closing covering 15B and including an image forming part 2 (see FIGS. 3 and 4) on the front face of the housing 10B. The parts covered with the first opening and closing covering 15B are the whole front face opening 43*a* of the medium discharge part 40, the front face part 18A, and the second front face part 18B.

An entire shape of the second opening and closing covering 11B is an oblong shape that is long in the up-down direction below a table part 61 on the front face of the housing 10B.

In other words, the entire shape of the second opening and closing covering 11B is the oblong shape that is long in the up-down direction that has been cut out in a shape of the parts opened and closed by the first opening and closing covering 15B.

Furthermore, as illustrated in FIGS. 6 and 7, the outer surface 11Ba of the second opening and closing covering 11B is a flat surface excluding curved surface parts curved backward at left and right end parts thereof. At least a part of the second opening and closing covering 11B that faces the opened first opening and closing covering 15B is an almost flat surface.

The second opening and closing covering 11B has an identical configuration to the second opening and closing covering 11A according to the first exemplary embodiment except for this.

As illustrated in FIG. 6, the image forming apparatus 1B configured as above is configured such that when the second opening and closing covering 11B and the first opening and closing covering 15B are closed, a part including at least the image forming part 2 and the front face opening 43*a* of the medium discharge part 40 on the front face of the housing 10B is covered with the second opening and closing covering 11B and first opening and closing covering 15B, which are non-transparent.

With this configuration, in a case where the image forming apparatus 1B is not used, for example, in a case where operations such as an image formation operation and an external reading operation are not performed, the medium discharge part 40 (the front face opening 43*a*) is not viewable from the front face side of the housing 10B. As a result, the image forming apparatus 1B may obtain neater outer appearance without the presence of the medium discharge part 40 and without the presence of a dividing line extending in the up-down direction between the second opening and closing covering 11B and the first opening and closing covering 15B when viewed from a near side of the front face of the housing 10B.

Furthermore, for example, in a case where the image forming apparatus 1B is used to perform an operation such as an image formation operation, only the first opening and closing covering 15B can be opened to the near side with respect to the front face Ft of the apparatus while closing the second opening and closing covering 11B, as illustrated in FIG. 7.

This causes the image forming apparatus 1 to be in a state in which at least the front face opening 43*a* of the medium discharge part 40, the front face part 18A, and the second front face part 18B are opened to an outside on the front face of the housing 10B. As a result, when a recording medium 9 on which an image has been formed by the image formation operation is discharged to the medium discharge part 40, a user may take out the discharged recording medium 9 from the medium discharge part 40 by inserting his or her hand, for example, from the front face opening 43*a* of the medium discharge part 40.

In the image forming apparatus 1B, as illustrated in FIG. 7, when the first opening and closing covering 15B is opened, the first opening and closing covering 15B is opened to such an extent that the outer surface of the first opening and closing covering 15B becomes close to or makes contact with the outer surface 11Ba of the second opening and closing covering 11B so that conditions similar to those in the case of the first opening and closing covering 15A according to the first exemplary embodiment are met (see FIG. 5B).

Accordingly, as illustrated in FIG. 5B, an amount E1 by which the opened first opening and closing covering 15B protrudes toward the near side with respect to the front face Ft of the apparatus from the outer surface 11Ba of the second opening and closing covering 11B markedly decreases in an almost similar manner to the case of the first opening and closing covering 15A according to the first exemplary embodiment, for example, as compared with an example of a configuration (protruding amount Ex) concerning the first opening and closing covering 150 and others according to Comparative Example 1 illustrated in FIG. 13.

Accordingly, in the image forming apparatus 1B, the amount E1 by which the opened first opening and closing covering 15B protrudes from the outer surface 11Ba of the second opening and closing covering 11B decreases to a level close to a limit as compared with Comparative Example 1 illustrated in FIG. 13 in which the first opening and closing covering 150 is opened only at the angle θx. Therefore, there is almost no possibility that the first opening and closing covering 15B crosses a trajectory of a hand of a user who is trying to take a recording medium 9 out from the medium discharge part 40. As a result, the image forming apparatus 1B has no risk of a situation where a user's hand hits the opened first opening and closing covering 15B, and the user may easily take out a recording medium 9 discharged to the medium discharge part 40.

Furthermore, also in the image forming apparatus 1B, the other effects described above obtained in the image forming apparatus 1A according to the first exemplary embodiment are obtained.

Third Exemplary Embodiment

Figure 8:
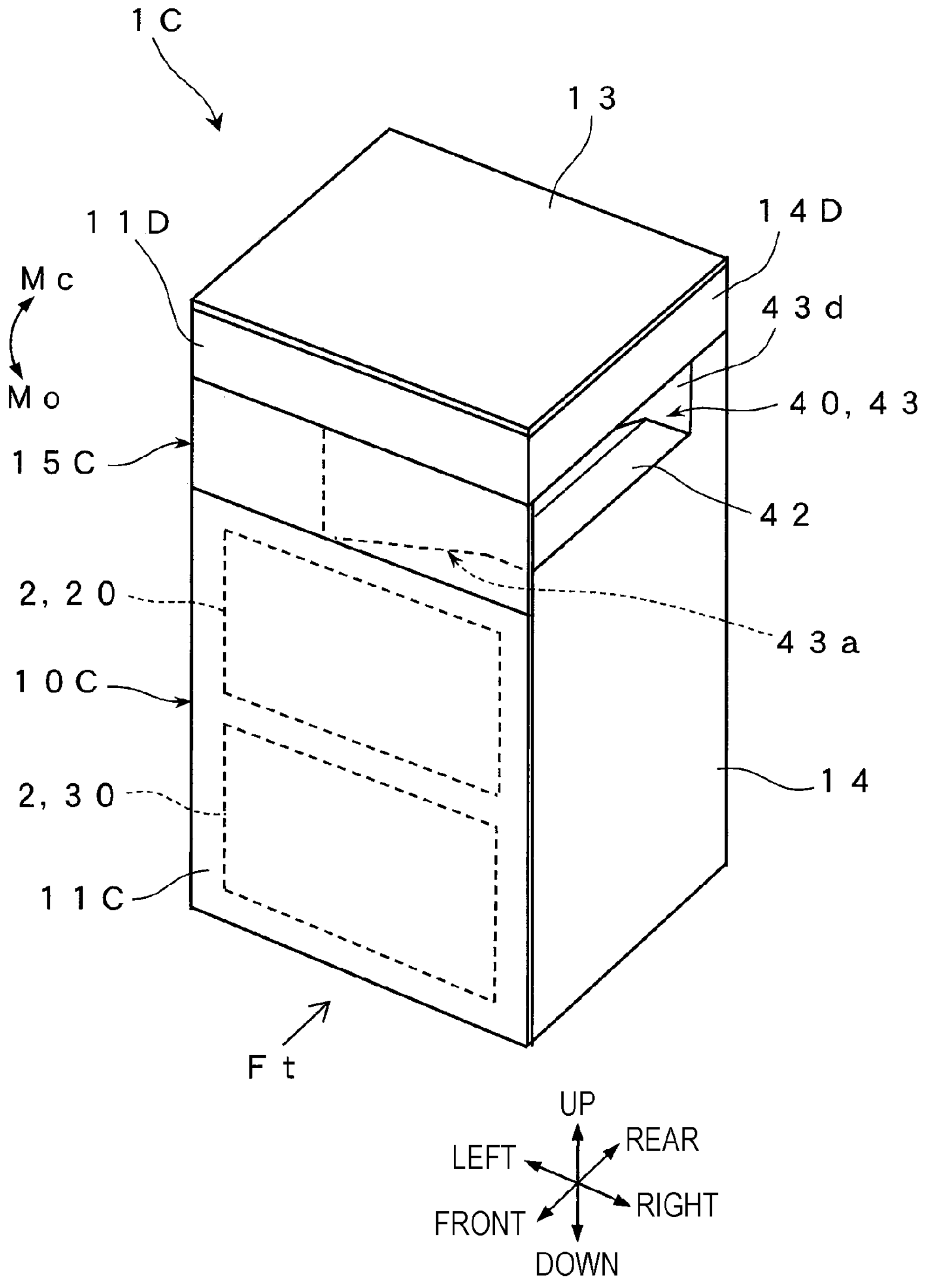
FIG. 8 is a perspective view of an image forming apparatus according to the third exemplary embodiment.
Figure 9:
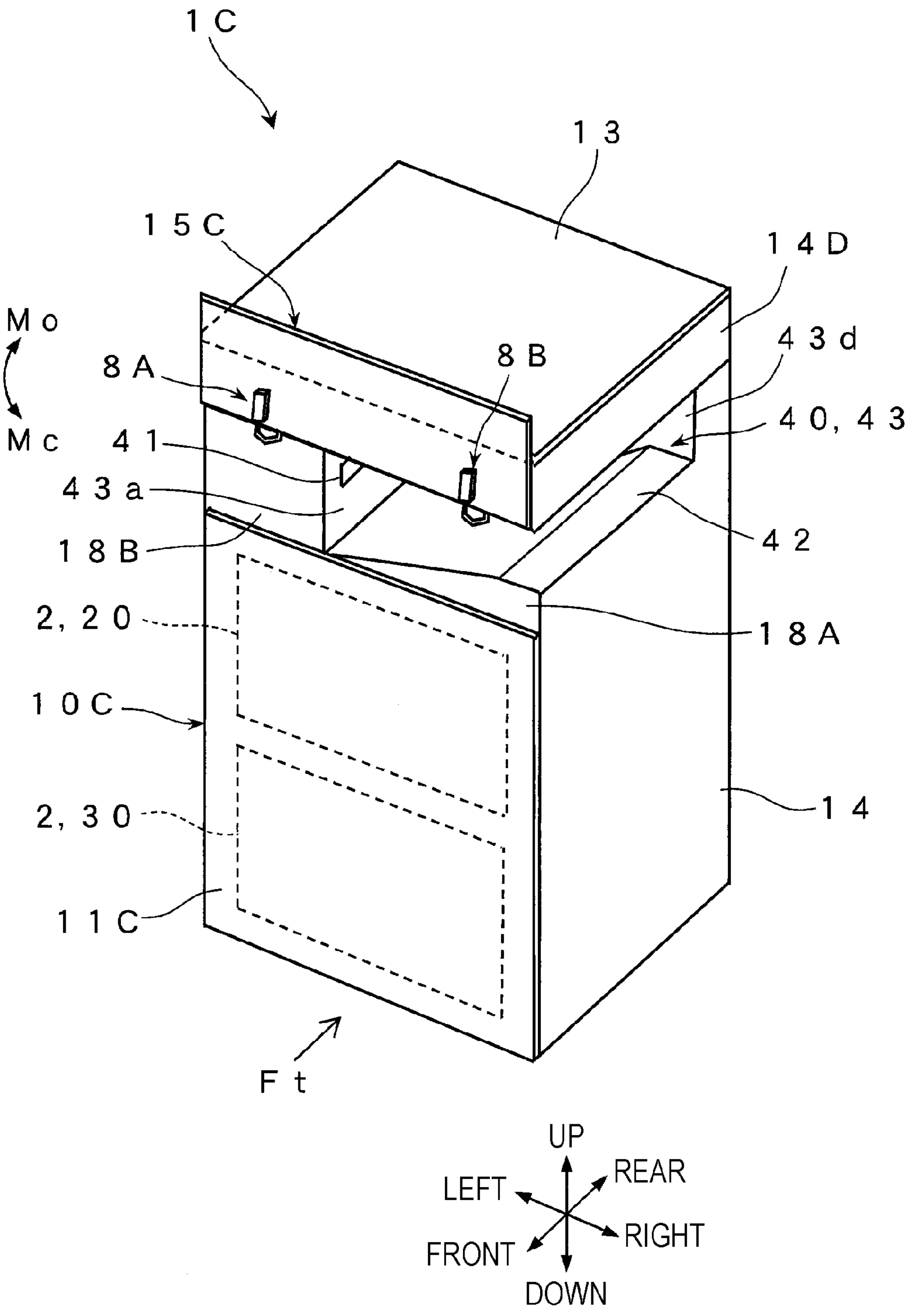
FIG. 9 is a perspective view illustrating a state where a first opening and closing covering of the image forming apparatus of FIG. 8 is opened.

FIG. 8 is a perspective view of an image forming apparatus 1C according to a third exemplary embodiment of the present disclosure viewed from a diagonally front side thereof. FIG. 9 is a perspective view illustrating a state where a first opening and closing covering 15C of the image forming apparatus 1C is opened.

As illustrated in FIGS. 8 and 9, the image forming apparatus 1C according to the third exemplary embodiment has an identical configuration to the image forming apparatus 1B according to the second exemplary embodiment except for that a housing 10C that does not have the external reading part 60 is used and a first opening and closing covering 15C that is opened and closed while being supported by opening closing support members 8A and 8B disposed on an upper end side is applied instead of the first opening and closing covering 15B.

In the following description, constituent parts identical to those in the second exemplary embodiment (and the first exemplary embodiment) are given identical reference signs, and description thereof is omitted except for a case where such description is necessary.

The housing 10C has an almost identical configuration to the housing 10B according to the second exemplary embodiment except for that the first opening and closing covering 15C is used and the external reading part 60 is omitted. Therefore, an image forming part 2 and a medium discharge part 40 are disposed inside the housing 10C.

Furthermore, an upper surface covering 13 is disposed on an upper surface part of the housing 10C because the external reading part 60 is omitted. Furthermore, the housing 10C is provided with exterior coverings such as a front face upper end covering 11D and a right upper end covering 14D between the upper surface covering 13 and an upper side part of the medium discharge part 40. Although the front face upper end covering 11D is an unopenable covering that does not open and close, the front face upper end covering 11D may be configured as an openable and closable covering.

The first opening and closing covering 15C according to the third exemplary embodiment is a covering whose entire outer appearance shape is an almost rectangular (strictly, horizontally-long almost oblong) shape. An outer surface 15Ca of the first opening and closing covering 15C is an almost flat surface.

Accordingly, the first opening and closing covering 15C can cover a whole front face opening 43*a* of the medium discharge part 40, a front face part 18A continuous directly below the front face opening 43*a*, and a second front face part 18B on the left side of the front face opening 43*a* on a front face of the housing 10C.

As illustrated in any of FIGS. 9 and 10 and other drawings, the first opening and closing covering 15C is configured such that an upper end part 15*t* thereof in a closed state is connected to a lower part of the front face upper end covering 11D, which is a part of the housing 10C, by being supported by the left and right opening closing support members 8A and 8B. With this configuration, the first opening and closing covering 15C is attached so as to open to such an extent that the first opening and closing covering 15C becomes close to or makes contact with the outer surface 11Da of the front face upper end covering 11D.

In this case, the left and right opening closing support members 8A and 8B applied to the first opening and closing covering 15C are used to connect the upper end part 15*t* of the closed first opening and closing covering 15C and the lower part of the front face upper end covering 11D and therefore function as upper hinges.

The state where the first opening and closing covering 15C is close to the outer surface 11Da, which is a surface of the front face upper end covering 11D, is a state where at least an upper end part of the opened first opening and closing covering 15C (actually, the lower end part 15*v* of the closed first opening and closing covering 15C) is close to but is not in contact with the outer surface 11Da of the front face upper end covering 11D.

The state where the first opening and closing covering 15C is in contact with the outer surface 11Da of the front face upper end covering 11D is a state where at least the lower end part 15*v* of the opened first opening and closing covering 15C is in contact with the outer surface 11Da of the front face upper end covering 11D.

Figure 10A:
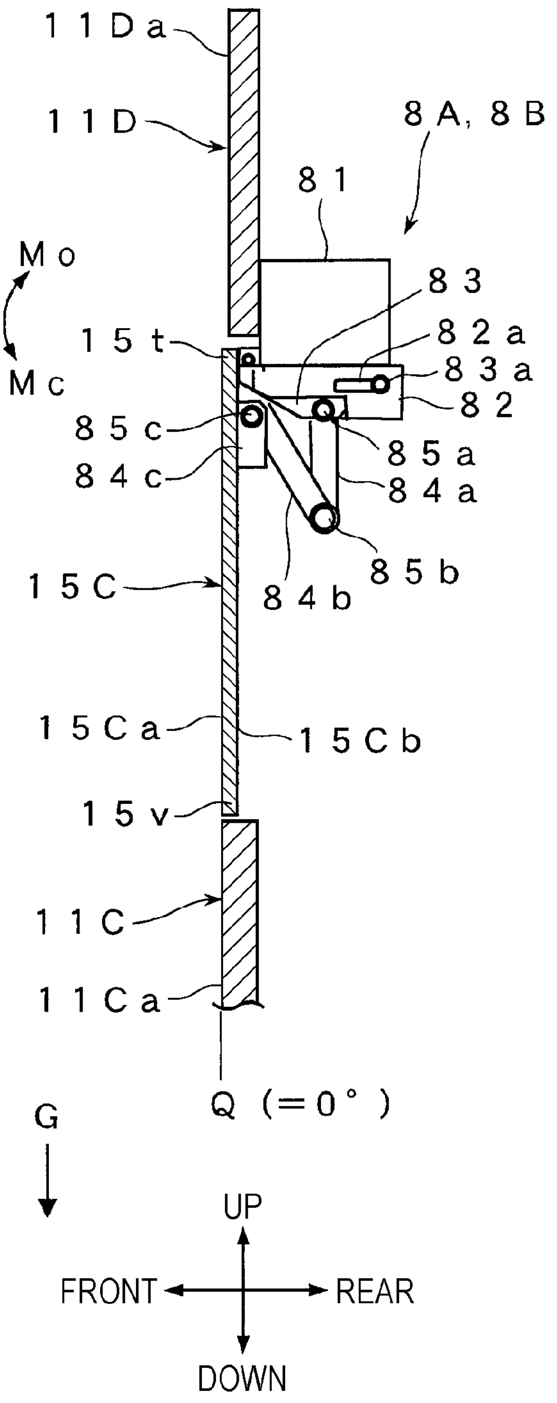
FIG. 10A is a schematic cross-sectional view illustrating members such as an opening closing support member in a state where the first opening and closing covering of FIG. 8 is closed.
Figure 10B:
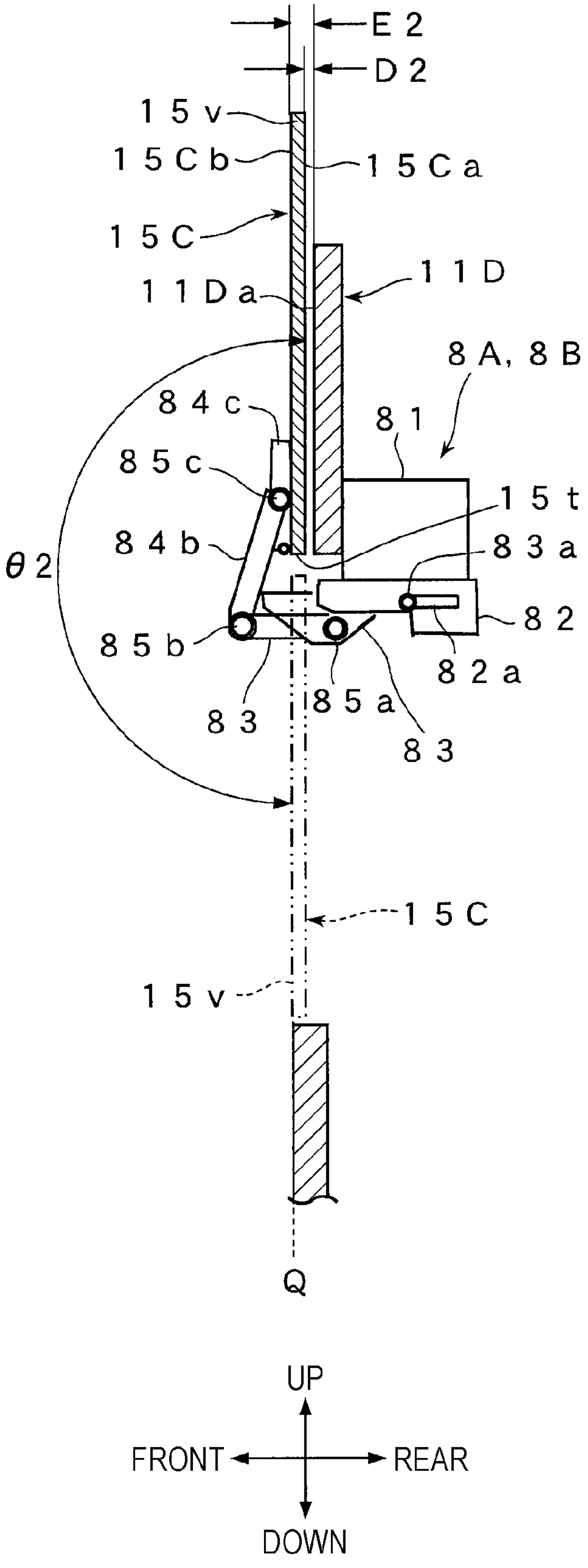
FIG. 10B is a schematic cross-sectional view illustrating members such as an opening closing support member in a state where the first opening and closing covering of FIG. 8 is opened.

Furthermore, as illustrated in FIG. 10B and other drawings, the first opening and closing covering 15C is attached by being supported by the left and right opening closing support members 8A and 8B so as to open at an angle θ2 within a range of 170° or more from the closed posture to the near side with respect to the front face of the housing 10C. With this configuration, the first opening and closing covering 15C is openable to such extent that the first opening and closing covering 15C becomes close to or makes contact with the outer surface 11Da of the front face upper end covering 11D.

In this case, the angle θ2 is an angle to the outer surface 15Ca of the first opening and closing covering 15C opened to the near side with respect to the front face of the housing 10C when a position of the outer surface 15Ca of the closed first opening and closing covering 15C or a position directly below the direction G of gravitational force is 0° (closed position Q), as illustrated in FIG. 10B. Although the first opening and closing covering 15C opens at the angle θ2 within a range of 170° or more, a maximum value of the angle θ2 is, for example, either an angle at which the first opening and closing covering 15C stops when making contact with a part of the housing 10C which the first opening and closing covering 15C makes contact with first when opened or an angle at which the left and right opening closing support members 8A and 8B are opened to the maximum.

Figure 14:
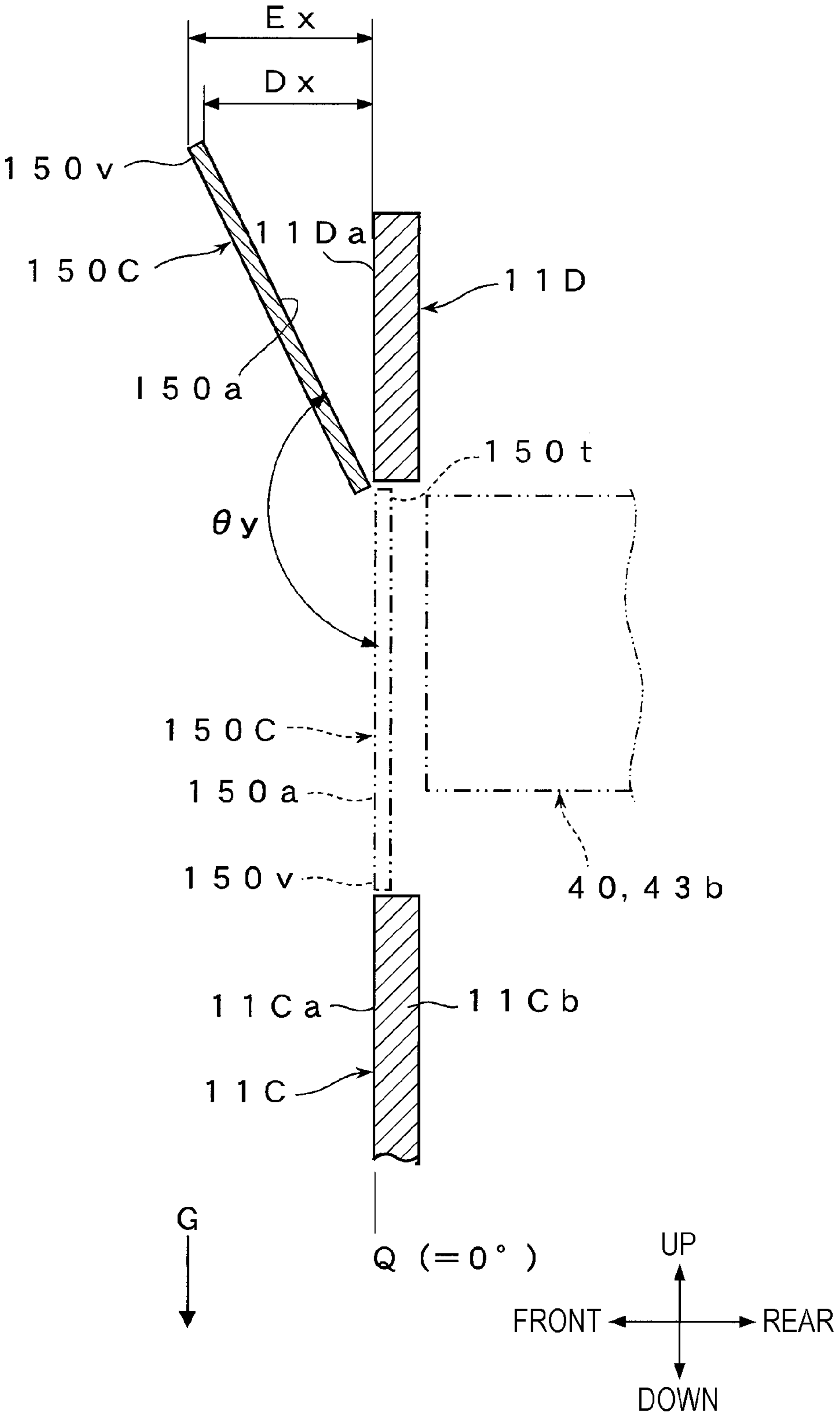
FIG. 14 is a schematic cross-sectional view illustrating a state where a first opening and closing covering that opens about an upper hinge is opened according to Comparative Example 2.

In a case where the first opening and closing covering 15C is configured to open at an angle θ2 within a range of 150° or less as in Comparative Example 2 illustrated in FIG. 14, the first opening and closing covering 15C may hinder a field of view of a user taking a recording medium 9 out from the medium discharge part 40 or a user's hand may hit the first opening and closing covering 15C when taking out a recording medium 9. It is therefore hard for the user to take out a recording medium 9 discharged to the medium discharge part 40.

As for the risk of hindering a field of view of a user, a line of sight of a user taking out a recording medium 9 is often directed from an upper side toward the medium discharge part 40. In this case, there is a high possibility that the line of sight crosses the first opening and closing covering 15C opened about the upper hinges. As a result, there is a high possibility that a field of view of a user seeing the medium discharge part 40 is hindered by the opened first opening and closing covering 15C.

Furthermore, the first opening and closing covering 15C is configured such that an upper end part 15*t* thereof in the closed state is connected to a lower part of the front face upper end covering 11D by the left and right opening closing support members 8A and 8B that supports the first opening and closing covering 15C to open to the near side with respect to the front face of the housing 10C by rotating in directions indicated by arrows Mo and Mc about at least one moving shaft, as illustrated in FIGS. 9, 10A, and 10B and other drawings.

The left and right opening closing support members 8A and 8B are similar to the opening closing support members 8A and 8B according to the first exemplary embodiment.

The first opening and closing covering 15C in the closed state is upright almost perpendicularly below a lower end of the front face upper end covering 11D and above an upper part of the second opening and closing covering 11C, as illustrated in FIG. 10A.

In this state, the first opening and closing covering 15C is held while being supported by the left and right opening closing support members 8A and 8B so that the outer surface 15Ca thereof is almost flush with an outer surface 11Ca of the second opening and closing covering 11C and the outer surface 11Da of the front face upper end covering 11D.

In this state, the left and right opening closing support members 8A and 8B are in an almost identical state to the opening closing support members 8A and 8B according to the first exemplary embodiment except for that upper and lower sides thereof are reversed.

Furthermore, in this state, the opening closing support members 8A and 8B are disposed on an inner side of the first opening and closing covering 15C and an inner side of the front face upper end covering 11D and therefore cannot be seen from the front face Ft side of the apparatus (see FIG. 8).

Furthermore, the first opening and closing covering 15C in the opened state is held close to or in contact with the outer surface 11Da of the front face upper end covering 11D so that the lower end part 15*v* thereof is located on an upper side and the upper end part 15*t* thereof is located on a lower side (in other words, in a state where front and rear surfaces are reversed) at a lower end of the front face upper end covering 11D, as illustrated in FIG. 10B.

In this state, the first opening and closing covering 15C is held while being supported by the left and right opening closing support members 8A and 8B so that the outer surface 15Ca is close to or in contact with the outer surface 11Da of the front face upper end covering 11D.

In this state, the left and right opening closing support members 8A and 8B move in an almost identical manner and are in an almost identical state to the opening closing support members 8A and 8B according to the first exemplary embodiment except for that upper and lower sides thereof are reversed. Furthermore, in this state, the first opening and closing covering 15C is substantially rotated about a moving third shaft 85*c* to be opened.

In this state, a second link 84*b* and a third link 84*c* of the left and right opening closing support members 8A and 8B can be seen from the front face Ft side of the apparatus (see FIGS. 8 and 10B).

Furthermore, in this state, a second shaft 85*b* and the third shaft 85*c* of the left and right opening closing support members 8A and 8B and shaft bearings thereof (not illustrated) are located on the near Ft side of the apparatus toward a use relative to the front face upper end covering 11D and the second opening and closing covering 11C, as illustrated in FIG. 10B.

As illustrated in FIG. 8, the image forming apparatus 1C configured as above is configured such that when the second opening and closing covering 11C and the first opening and closing covering 15C are closed, a part including at least the image forming part 2 and the front face opening 43*a* of the medium discharge part 40 on the front face of the housing 10C is covered with the second opening and closing covering 11C and first opening and closing covering 15C, which are non-transparent.

Furthermore, for example, in a case where the image forming apparatus 1C is used to perform an operation such as an image formation operation, only the first opening and closing covering 15C can be opened to the near side with respect to the front face Ft of the apparatus while closing the second opening and closing covering 11C, as illustrated in FIG. 9.

This causes the image forming apparatus 1C to be in a state in which at least the front face opening 43*a* of the medium discharge part 40, the front face part 18A, and the second front face part 18B are opened to an outside on the front face of the housing 10C. As a result, when a recording medium 9 on which an image has been formed by the image formation operation is discharged to the medium discharge part 40, a user may take out the discharged recording medium 9 from the medium discharge part 40 by inserting his or her hand, for example, from the front face opening 43*a* of the medium discharge part 40.

In the image forming apparatus 1C, when the first opening and closing covering 15C is opened, the first opening and closing covering 15C is opened to such an extent that the outer surface 15Ca of the first opening and closing covering 15C becomes close to or makes contact with the outer surface 11Da of the front face upper end covering 11D so that the above conditions are met, as illustrated in FIGS. 9 and 10B.

Accordingly, as illustrated in FIG. 10B, an amount E2 by which the opened first opening and closing covering 15C protrudes toward the near side with respect to the front face Ft of the apparatus from the outer surface 11Da of the front face upper end covering 11D markedly decreases, for example, as compared with an example of a configuration (protruding amount Ex) concerning a first opening and closing covering 150C and others according to Comparative Example 2 illustrated in FIG. 14.

In this case, Comparative Example 2 illustrated in FIG. 14 is an example of a configuration in which the first opening and closing covering 150C supported by an upper hinge is opened only at an angle θy within a range of approximately 90° to 150° toward the near side with respect to the front face from a position of 0° (closed position Q), which is a closed posture of the first opening and closing covering 150C or a position directly below the direction G of gravitational force.

Accordingly, in the image forming apparatus 1C, the amount E2 by which the opened first opening and closing covering 15C protrudes from the outer surface 11Da of the front face upper end covering 11D decreases to a level close to a limit as illustrated in FIG. 10B as compared with Comparative Example 2 illustrated in FIG. 14 in which the first opening and closing covering 150C is opened only at the angle θy. Therefore, there is almost no possibility that the first opening and closing covering 15C hinders a field of view of a user taking a recording medium 9 out from the medium discharge part 40, and there is almost no possibility that the first opening and closing covering 15C crosses a trajectory of a hand of a user who is trying to take a recording medium 9 out from the medium discharge part 40. As a result, the image forming apparatus 1C has no risk of a situation where a user's field of view is hindered by the opened first opening and closing covering 15C and no risk of a situation where a user's hand hits the opened first opening and closing covering 15C, and the user may easily take out the recording medium 9 discharged to the medium discharge part 40.

Furthermore, as illustrated in FIG. 10B, the left and right opening closing support members 8A and 8B of the image forming apparatus 1C are also configured such that the second shaft 85*b*, the third shaft 85*c*, and shaft bearings thereof (not illustrated) are located on the near side with respect to the front face Ft of the apparatus relative to the second opening and closing covering 11C and the front face upper end covering 11D.

Accordingly, in the image forming apparatus 1C, the first opening and closing covering 15C may be easily opened to become close to or make contact with the outer surface 11Da of the front face upper end covering 11D so that the above conditions are met, as compared with a case where the second shaft 85*b* and the third shaft 85*c* of the left and right opening closing support members 8A and 8B and shaft bearings thereof are attached so as not to be located on the near side with respect to the front face Ft of the apparatus relative to the second opening and closing covering 11C and the front face upper end covering 11D when the first opening and closing covering 15C is opened.

Furthermore, the front face upper end covering 11D of the image forming apparatus 1C, which is a part of the housing 10C, is configured such that at least a part thereof that faces the opened first opening and closing covering 15C is a flat surface, as illustrated in FIGS. 8, 10A, and 10B and other drawings.

Accordingly, in the image forming apparatus 1C, at least the part of the front face upper end covering 11D that faces the first opening and closing covering 15C has nothing to inhibit opening of the first opening and closing covering 15C, and therefore the first opening and closing covering 15C may be easily opened so that the above conditions are met, as compared with a case where the at least the part of the front face upper end covering 11D that faces the opened first opening and closing covering 15C is a surface having a part protruding, for example, forward from other parts.

In addition, as illustrated in FIG. 10B, the first opening and closing covering 15C of the image forming apparatus 1C is attached by being supported by the left and right opening closing support members 8A and 8B so as to be openable to such an extent that a distance D2 between an upper end part (the lower end part 15*v* of the closed first opening and closing covering 15C) and the front face upper end covering 11D becomes 10 mm or less. With this configuration, the first opening and closing covering 15C is openable to such an extent that the first opening and closing covering 15C becomes close to or makes contact with the outer surface 11Da of the front face upper end covering 11D.

Modifications

The present disclosure is not limited to the contents illustrated in the first to third exemplary embodiments and encompasses, for example, the following modifications.

A first opening and closing covering 15E illustrated in FIG. 11 may be applied as the first opening and closing coverings 15B and 15C in the second and third exemplary embodiments.

The first opening and closing covering 15E illustrated in FIG. 11 is an opening and closing covering configured to open and close so as to cover a part including a part of the front face opening 43*a* of the medium discharge part 40. More specifically, the first opening and closing covering 15E covers a part of the front face opening 43*a* of the medium discharge part 40, a part of the front face part 18A, and a part of the second front face part 18B.

In this case, the part of the front face opening 43*a* of the medium discharge part 40 is a part that occupies approximately 80% of the whole front face opening 43*a*, for example, from a perspective of blocking access of a user's hand from the front face opening 43*a* of the medium discharge part 40 when it is unnecessary to take a recording medium 9 out from the medium discharge part 40.

Furthermore, the first opening and closing covering 15A according to the first exemplary embodiment may also be configured as an opening and closing covering that covers a part of the front face opening 43*a* of the medium discharge part 40.

Opening closing support members 8C illustrated in FIG. 12 may be applied as left and right opening closing support members 8 of the first opening and closing coverings 15A and 15B according to the first and second exemplary embodiments instead of the left and right opening closing support members 8A and 8B.

Each of the opening closing support members 8C is a simplified opening closing support member including a body part 86, a movable part 87, and two shafts 85*d* and 85*e*.

The body part 86 is a part fixedly attached to an upper part of the second opening and closing covering 11A or 11B. The movable part 87 is a part that is rotatably attached to an upper end part of the body part 86 and is rotatably attached to the lower end part 15*v* of the first opening and closing coverings 15A or 15B. The two shafts 85*d* and 85*e* are shafts that rotatably connect the body part 86 and the movable part 87 and the movable part 87 and the lower end part 15*v* of the first opening and closing covering 15A or 15B. The shaft 85*e* is a shaft that moves as the movable part 87 moves.

The opening closing support members 8C may also be applied to the first opening and closing covering 15C according to the third exemplary embodiment.

Figure 12B:
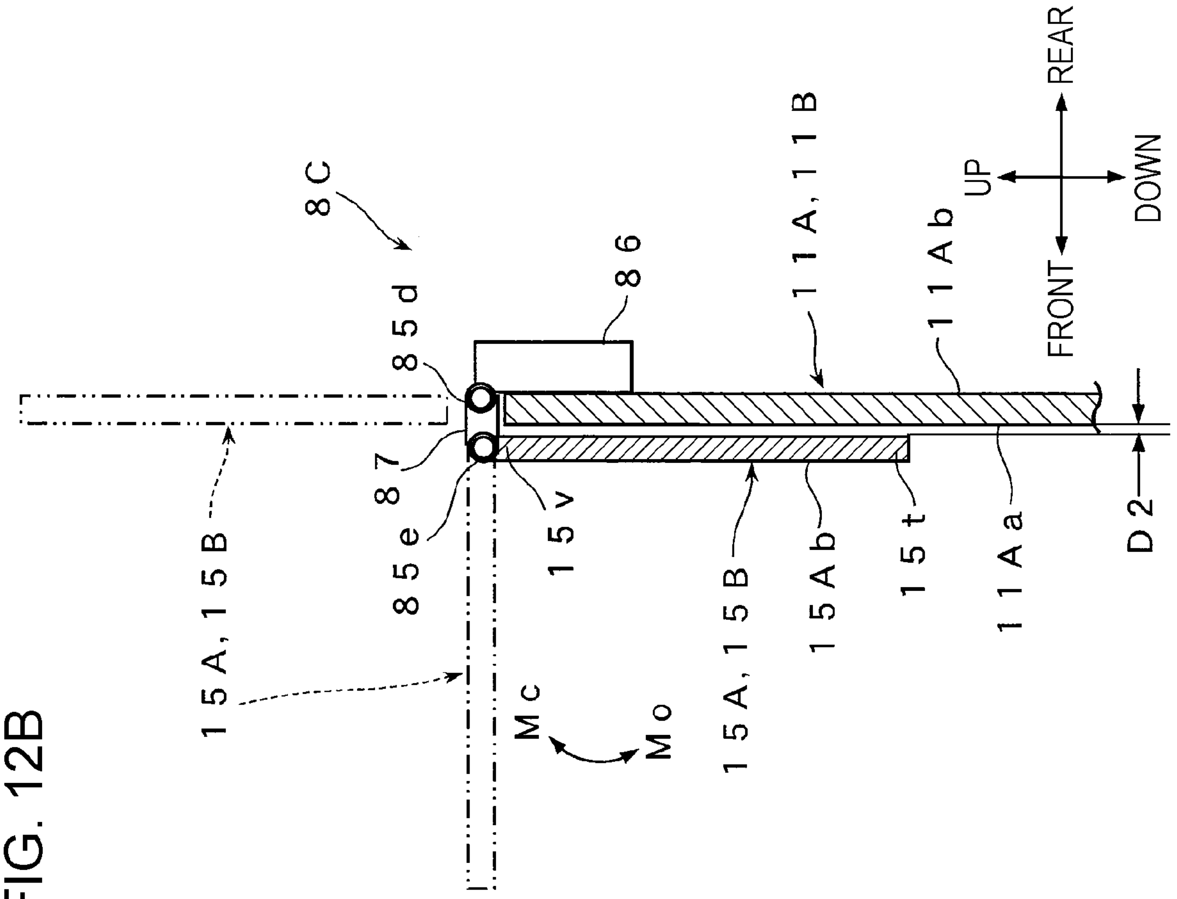
FIG. 12B is schematic cross-sectional view illustrating members such as another opening closing support member in a state where the first opening and closing covering is opened.
Figure 12A:
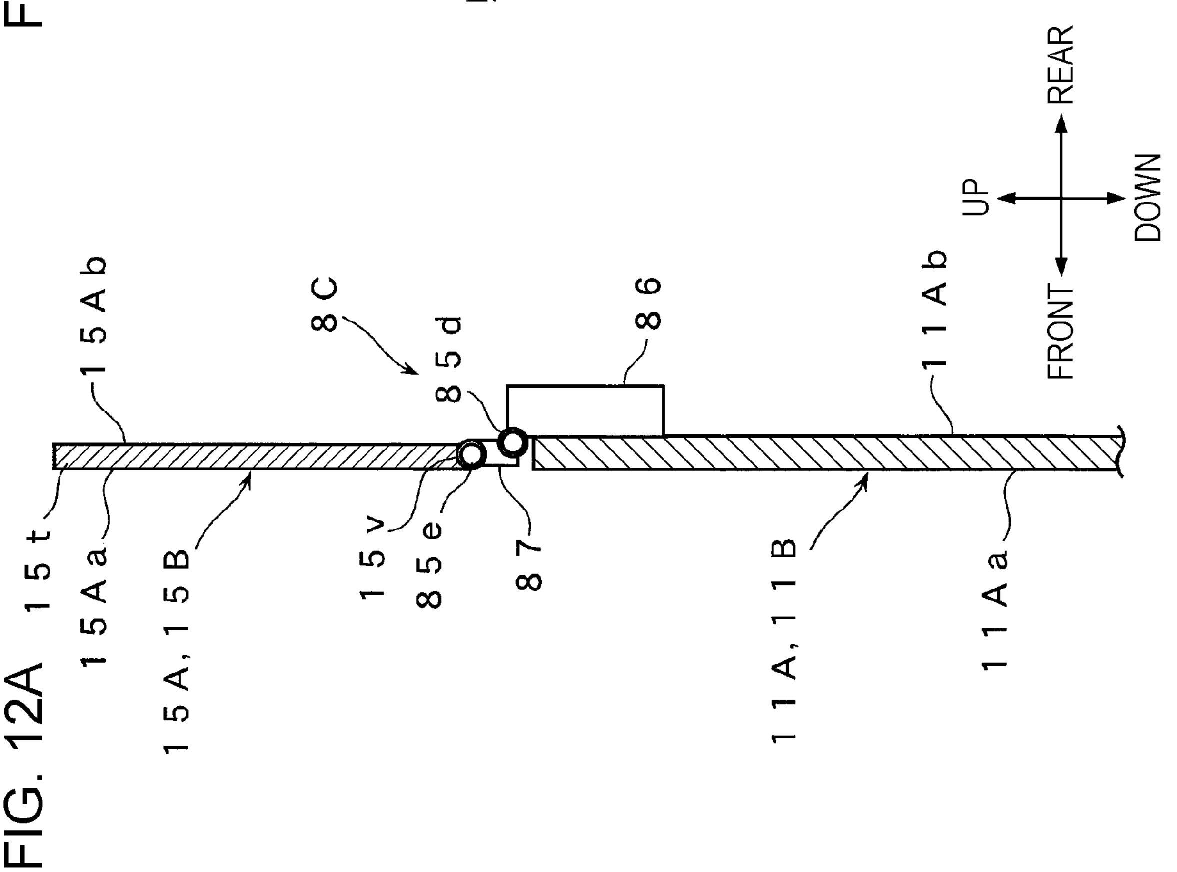
FIG. 12A is schematic cross-sectional view illustrating members such as another opening closing support member in a state where the first opening and closing covering is closed.

For example, the closed first opening and closing covering 15A to which the opening closing support members 8C are applied is held upright almost perpendicularly above an upper end of the second opening and closing covering 11A, as illustrated in FIG. 12A.

In this state, the first opening and closing covering 15A is held by the left and right opening closing support members 8C so that the outer surface 15Aa thereof is almost flush with the outer surface 11Aa of the second opening and closing covering 11A.

In this state, the movable parts 87 of the left and right opening closing support members 8C are upright almost perpendicularly above the upper end of the second opening and closing covering 11A.

Furthermore, in this state, the opening closing support members 8C are disposed on an inner side of the first opening and closing covering 15A and an inner side of the second opening and closing covering 11A and therefore cannot seen from the front face Ft side of the apparatus when the first opening and closing covering 15A is closed (see FIG. 12A).

Furthermore, as illustrated in FIG. 12B, the first opening and closing covering 15A in the opened state is held close to or in contact with the outer surface 11Aa of the second opening and closing covering 11A so that the upper end part 15*t* thereof is located on a lower side and the lower end part 15*v* thereof is located on an upper side (in other words, front and rear surfaces are reversed) at an upper end of the second opening and closing covering 11A.

In this state, the first opening and closing covering 15A is held while being supported by the left and right opening closing support member 8C so that the outer surface 15Aa thereof is close to or in contact with the outer surface 11Aa of the second opening and closing covering 11A.

First, the movable parts 87 of the left and right opening closing support members 8C rotate about the fourth shaft 85*d*, fall toward the near side with respect to the front face of the apparatus together with the first opening and closing covering 15A, and are maintained in an almost horizontal posture. Next, the first opening and closing covering 15A rotates by an angle of almost 90° about the fifth shaft 85*e* with respect to the movable part 87 maintained in the horizontal posture so as to fall downward close to the outer surface 11Aa of the second opening and closing covering 11A.

In this state, the movable parts 87 of the left and right opening closing support members 8C can be seen from the front face Ft side of the apparatus (see FIG. 12B).

Furthermore, in this state, as illustrated in FIG. 12B, the fifth shafts 85*e* of the left and right opening closing support members 8C and shaft bearings thereof (not illustrated) are located on the near Ft side of the apparatus relative to the second opening and closing covering 11A.

A covering that does not open and close may be applied as the second opening and closing coverings 11A, 11B, and 11C according to the first to third exemplary embodiments.

In the image forming apparatus 1A according to the first exemplary embodiment, the first opening and closing covering 15A may be configured as a semi-transparent covering.

The "semi-transparent" is, for example, such a degree of transparency that a contour of the front face opening 43*a* (actually, the stacking surface part 42) of the medium discharge part 40 can be seen slightly (vaguely) through the closed first opening and closing covering 15A or such a degree of transparency that the contour cannot be seen through in an ordinary state but can be seen through slightly when the discharge space 43 of the medium discharge part 40 is brighter than the ordinary state.

According to this configuration, even when the first opening and closing covering 15A is closed, the medium discharge part 40 (actually, the stacking surface part 42) can be slightly seen through the first opening and closing covering 15A (for example, see the stacking surface part 42 indicated by the broken line in FIG. 1).

Furthermore, in this case, the image forming apparatus 1A may include an illuminating part that illuminates the discharge space 43 of the medium discharge part 40 when a recording medium 9 is discharged to the stacking surface part 42 of the medium discharge part 40. In this case, a user can know that the discharge space 43 of the medium discharge part 40 is brighter than in the ordinary state even when the first opening and closing covering 15A is closed, and therefore it is possible to make the user notice (call user's attention to) the presence of a recording medium 9 which the user forgot to take on the stacking surface part 42 of the medium discharge part 40.

The "semi-transparent" may be such a degree of transparency that the presence of a recording medium 9 discharged to the stacking surface part 42 of the medium discharge part 40 can be seen through the closed first opening and closing covering 15A.

Also in the image forming apparatuses 1B and 1C according to the second and third exemplary embodiments, the first opening and closing coverings 15B and 15C may be configured as semi-transparent coverings.

In this case, it is possible to employ a configuration in which the whole first opening and closing coverings 15B and 15C are semi-transparent or a configuration in which only parts of the first opening and closing coverings 15B and 15C that cover the front face opening 43*a* of the medium discharge part 40 and the front face part 18A are semi-transparent.

According to such a configuration, even in a case where the first opening and closing coverings 15B and 15C are closed, at least the medium discharge part 40 (actually, the stacking surface part 42) can be slightly seen through the first opening and closing coverings 15B and 15C (see, for example, the stacking surface part 42 and others indicated by the broken line in FIGS. 6 and 8).

The medium discharge part 40 is not limited to one off-centered to a right side in the left-right direction in the housing 10A (10B, 10C) and may be one off-centered to a left side in the left-right direction.

Furthermore, the front face opening 43*a* of the medium discharge part 40 is not limited to the shape of the front face opening 43*a* in the first exemplary embodiment etc., and may have another shape corresponding to the shape of the discharge space 43 or the stacking surface part 42.

The image forming apparatus 1 may be an image forming apparatus in which the external reading part 60, which is provided in the image forming apparatuses 1A and 1B according to the first and second exemplary embodiments, is omitted. For example, the image forming apparatus 1C according to the third exemplary embodiment is an example of the image forming apparatus in which the external reading part 60 is omitted.

Furthermore, the image forming apparatus is not limited to one in which the image forming part 2 is an electrophotographic-system image forming part using a developer and may be one having an image forming part 2 of another image formation system (for example, an ink ejection system).

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:

a housing;

an image forming part that forms an image on a recording medium;

a medium discharge part that has a space opened to an outside through a front face opening off-centered toward one of left and right on a front face of the housing and a side face opening continuous from the front face opening and in which a recording medium on which an image has been formed by the image forming part is discharged to the space;

a first opening and closing covering that is opened and closed to cover a part including a part of the front face opening of the medium discharge part on the front face of the housing; and a second covering that covers at least a part excluding the part covered with the first opening and closing covering on the front face of the housing, is in a state within a range of 10° on a front side or a rear side from a state perpendicular to an installation surface, and is longer in an up-down direction than the first opening and closing covering, wherein the first opening and closing covering is attached so that a lower end part thereof in a closed state is connected to an upper part of the second covering by an opening closing support member that supports the first opening and closing covering so as to open the first opening and closing covering in a direction away from the front face of the housing by rotating about at least one moving shaft, and thereby the first opening and closing covering is openable to such an extent that a distance between a lower end part thereof in an opened state and the second covering becomes 10 mm or less, wherein an entire shape of the second covering is a shape corresponding to a part of the front face of the housing.

2. An image forming apparatus comprising:

a housing;

an image forming part that forms an image on a recording medium;

a medium discharge part that has a space opened to an outside through a front face opening off-centered toward one of left and right on a front face of the housing and a side face opening continuous from the front face opening and in which a recording medium on which an image has been formed by the image forming part is discharged to the space;

a first opening and closing covering that is opened and closed to cover a part including a part of the front face opening of the medium discharge part on the front face of the housing; and a second covering that covers at least a part excluding the part covered with the first opening and closing covering on the front face of the housing, wherein the first opening and closing covering is attached so that a lower end part thereof in a closed state is connected to an upper part of the second covering by an opening closing support member that supports the first opening and closing covering so as to open the first opening and closing covering in a direction away from the front face of the housing by rotating about at least one moving shaft, and thereby the first opening and closing covering is opened at an angle within a range of 170° to 180° from a closed posture, wherein an entire shape of the second covering is a shape corresponding to a part of the front face of the housing.

3. An image forming apparatus comprising:

a housing;

an image forming part that forms an image on a recording medium;

a medium discharge part that has a space opened to an outside through a front face opening off-centered toward one of left and right on a front face of the housing and a side face opening continuous from the front face opening and in which a recording medium on which an image has been formed by the image forming part is discharged to the space;

a first opening and closing covering that is opened and closed to cover a part including a part of the front face opening of the medium discharge part on the front face of the housing; and a second covering that covers at least a part excluding the part covered with the first opening and closing covering on the front face of the housing, wherein the first opening and closing covering is attached so that an upper end part thereof in a closed state is connected to the housing by an opening closing support member that supports the first opening and closing covering so as to open the first opening and closing covering in a direction away from the front face of the housing by rotating about at least one moving shaft, and thereby the first opening and closing covering is opened at an angle of 170° or more from a closed posture, wherein an entire shape of the second covering is a shape corresponding to a part of the front face of the housing.

4. The image forming apparatus according to claim 1, wherein:

the opening closing support member is attached so that the at least one shaft and a shaft bearing thereof are located on a near side with respect to a user relative to the second covering when the first opening and closing covering is opened.

5. The image forming apparatus according to claim 2, wherein:

the opening closing support member is attached so that the at least one shaft and a shaft bearing thereof are located on a near side with respect to a user relative to the second covering when the first opening and closing covering is opened.

6. The image forming apparatus according to claim 3, wherein:

the opening closing support member is attached so that the at least one shaft and a shaft bearing thereof are located on a near side with respect to a user relative to the second covering when the first opening and closing covering is opened.

7. The image forming apparatus according to claim 1, wherein:

at least a part of the second covering that faces the first opening and closing covering in the opened state is a flat surface.

8. The image forming apparatus according to claim 2, wherein:

at least a part of the second covering that faces the first opening and closing covering in the opened state is a flat surface.

9. The image forming apparatus according to claim 4, wherein:

at least a part of the second covering that faces the first opening and closing covering in the opened state is a flat surface.

10. The image forming apparatus according to claim 5, wherein:

at least a part of the second covering that faces the first opening and closing covering in the opened state is a flat surface.

11. The image forming apparatus according to claim 6, wherein:

at least a part of the second covering that faces the first opening and closing covering in the opened state is a flat surface.

12. The image forming apparatus according to claim 3, wherein:

at least a part of the housing that faces the first opening and closing covering in an opened state is a flat surface.

13. The image forming apparatus according to claim 4, wherein:

at least a part of the housing that faces the first opening and closing covering in an opened state is a flat surface.

14. The image forming apparatus according to claim 5, wherein:

at least a part of the housing that faces the first opening and closing covering in an opened state is a flat surface.

15. The image forming apparatus according to claim 6, wherein:

at least a part of the housing that faces the first opening and closing covering in an opened state is a flat surface.

* * * * *